(12) United States Patent
Thoma et al.

(10) Patent No.: US 11,882,323 B2
(45) Date of Patent: **\*Jan. 23, 2024**

(54) AUDIO SPLICING CONCEPT

(71) Applicant: Fraunhofer-Gesellschaft zur Foerderung der angewandten Forschung e.V., Munich (DE)

(72) Inventors: Herbert Thoma, Erlangen (DE); Robert Bleidt, Santa Clara, CA (US); Stefan Kraegeloh, Erlangen (DE); Max Neuendorf, Erlangen (DE); Achim Kuntz, Erlangen (DE); Andreas Niedermeier, Erlangen (DE); Michael Kratschmer, Erlangen (DE)

(73) Assignee: Fraunhofer-Gesellschaft zur Foerderung der angewandten Forschung e.V., Munich (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 17/940,849

(22) Filed: Sep. 8, 2022

(65) Prior Publication Data

US 2023/0074155 A1  Mar. 9, 2023

Related U.S. Application Data

(63) Continuation of application No. 17/330,253, filed on May 25, 2021, now Pat. No. 11,477,497, which is a
(Continued)

(30) Foreign Application Priority Data

Sep. 9, 2014 (EP) ..................................... 14184141
Feb. 11, 2015 (EP) ..................................... 15154752

(51) Int. Cl.
*H04N 21/233* (2011.01)
*H04N 21/234* (2011.01)
(Continued)

(52) U.S. Cl.
CPC .... *H04N 21/23424* (2013.01); *H04H 20/103* (2013.01); *H04L 47/34* (2013.01);
(Continued)

(58) Field of Classification Search
CPC ....... H04L 47/34; H04L 65/70; H04H 20/103; H94N 21/439; H94N 21/4302; H94N 21/233; H94N 21/23424; H94N 21/44004
(Continued)

(56) References Cited

U.S. PATENT DOCUMENTS 5,899,969 A    5/1999  Fielder et al.
6,678,332 B1 \*  1/2004  Gardere ........... H04N 21/23424
                                            375/240.26
(Continued)

FOREIGN PATENT DOCUMENTS

CN     1969561 A    5/2007
CN   102177542 A    9/2011
(Continued)

OTHER PUBLICATIONS

"Text of ISO/IEC 23008-3/CD, 3D audio", ISO/IEC JTC1/SC29/WG11 N14459, València, Spain, Apr. 15, 2014, 339 pages.
(Continued)

*Primary Examiner* — Melur Ramakrishnaiah
(74) *Attorney, Agent, or Firm* — Perkins Coie LLP; Michael A. Glenn

(57) ABSTRACT

Audio splicing is rendered more effective by the use of one or more truncation unit packets inserted into the audio data stream so as to indicate to an audio decoder, for a predetermined access unit, an end portion of an audio frame with which the predetermined access unit is associated, as to be discarded in playout.

8 Claims, 17 Drawing Sheets

Related U.S. Application Data continuation of application No. 16/712,990, filed on Dec. 13, 2019, now Pat. No. 11,025,968, which is a continuation of application No. 15/452,190, filed on Mar. 7, 2017, now Pat. No. 10,511,865, which is a continuation of application No. PCT/EP2015/070493, filed on Sep. 8, 2015.

(51) Int. Cl.

| | | |
|---|---|---|
| *H04N 21/439* | (2011.01) | |
| *H04H 20/10* | (2008.01) | |
| *H04N 21/44* | (2011.01) | |
| *H04N 21/43* | (2011.01) | |
| *H04L 65/70* | (2022.01) | |
| *H04L 65/75* | (2022.01) | |
| *H04L 47/34* | (2022.01) | |

(52) U.S. Cl.
CPC .............. *H04L 65/70* (2022.05); *H04L 65/75* (2022.05); *H04N 21/233* (2013.01); *H04N 21/4302* (2013.01); *H04N 21/439* (2013.01); *H04N 21/44004* (2013.01)

(58) Field of Classification Search
USPC .................................................... 375/240.26
See application file for complete search history.

(56) References Cited

U.S. PATENT DOCUMENTS

| | | | |
|---|---|---|---|
| 6,792,047 B1 | 9/2004 | Bixby et al. | |
| 6,806,909 B1* | 10/2004 | Radha .................. | H04N 21/233 |
| | | | 375/E7.023 |
| 7,096,481 B1 | 8/2006 | Forecast et al. | |
| 8,589,999 B1 | 11/2013 | Cohen et al. | |
| 9,596,461 B2 | 3/2017 | Chong et al. | |
| 10,057,574 B2 | 8/2018 | Li et al. | |
| 10,212,425 B2 | 2/2019 | Matsunobu et al. | |
| 10,841,581 B2 | 11/2020 | Ramamurthy et al. | |
| 2002/0172281 A1 | 11/2002 | Mantchala et al. | |
| 2003/0045957 A1 | 3/2003 | Haberman et al. | |
| 2004/0001695 A1 | 1/2004 | Evans et al. | |
| 2004/0162721 A1 | 8/2004 | Oomen et al. | |
| 2005/0281255 A1 | 12/2005 | Davies et al. | |
| 2006/0093045 A1 | 5/2006 | Anderson et al. | |
| 2006/0117099 A1* | 6/2006 | Mogul .................. | H04L 43/026 |
| | | | 709/213 |
| 2008/0049947 A1 | 2/2008 | Yoneda et al. | |
| 2010/0189131 A1 | 7/2010 | Branam et al. | |
| 2010/0208901 A1 | 8/2010 | Kawakami et al. | |
| 2011/0224994 A1 | 9/2011 | Norvell et al. | |
| 2011/0274158 A1 | 11/2011 | Fu et al. | |
| 2011/0293021 A1 | 12/2011 | Kotalwar et al. | |
| 2012/0128062 A1 | 5/2012 | Mehta et al. | |
| 2012/0287988 A1 | 11/2012 | Chong et al. | |
| 2013/0041672 A1* | 2/2013 | Doehla ................. | G10L 19/167 |
| | | | 704/500 |
| 2013/0094569 A1 | 4/2013 | Chong et al. | |
| 2014/0321552 A1 | 10/2014 | He et al. | |
| 2015/0020095 A1 | 1/2015 | Yoo et al. | |
| 2015/0124869 A1 | 5/2015 | Fu et al. | |
| 2015/0172678 A1 | 6/2015 | Alshina et al. | |
| 2017/0041638 A1 | 2/2017 | Fu et al. | |
| 2018/0184123 A1 | 6/2018 | Terada et al. | |
| 2018/0352225 A1 | 12/2018 | Guo et al. | |
| 2019/0104307 A1 | 4/2019 | Mei et al. | |

FOREIGN PATENT DOCUMENTS

| | | | | |
|---|---|---|---|---|
| CN | 102971788 A | | 3/2013 | |
| EP | 1115252 A2 | | 7/2001 | |
| JP | H11259096 A | | 9/1999 | |
| JP | 2000206994 A | | 7/2000 | |
| JP | 2001521347 A | | 11/2001 | |
| JP | 2004272054 A | | 9/2004 | |
| JP | 2004538502 A | | 12/2004 | |
| JP | 2008020863 A | | 1/2008 | |
| JP | 4229586 B2 | | 12/2008 | |
| JP | 2013528825 A | | 7/2013 | |
| KR | 20130006691 A | | 1/2013 | |
| RU | 2509378 C2 | | 3/2014 | |
| WO | WO-0146957 A1 * | | 6/2001 | ........... G10L 19/005 |
| WO | 2009104402 A1 | | 8/2009 | |
| WO | 2010040381 A1 | | 4/2010 | |
| WO | 2010125582 A2 | | 11/2010 | |
| WO | 2011021239 A1 | | 2/2011 | |
| WO | 2011128342 A1 | | 10/2011 | |
| WO | 2016038034 A1 | | 3/2016 | |

OTHER PUBLICATIONS

BR Nat'l Off of Indust'l Prop, "Office Action on applicant's parallel BR patent application No. BR112017003288-0 (dated Aug. 18, 2020)".

ISO/IEC DTR , "Information technology—Coding of audio-visual objects—Part 24: Audio and Systems Interaction", ISO/IEC DTR 14496-24, [SC29/WG 11 N 8837],, Feb. 27, 2007, 16 pages.

Korean Intellectual Property Off, "Office Action dated Feb. 7, 2018, on corresponding KR Patent Appl'n No. 10-2017-7009600 (with English Translation)".

Korean IPO, "Notice of Allowance of Applicant's counterpart application No. 10-2017-7009600, dated Apr. 9, 2019".

Intellectual Property India, "Office Action dated Feb. 21, 2020, on corresponding IN Application No. 201717007049".

Russian Patent Office, "Official Action on corresponding RU Patent Application No. 2017/111578/07".

* cited by examiner

| Syntax | No. of bits | Mnemonic |
|---|---|---|
| cuTruncationInfo() { | | |
|   isActive; ~52 | 1 | bool |
|   canSplice; ~50 | 1 | bool |
|   truncRight; ~54 | 1 | bool |
|   nTruncSamples; ~48 | 13 | uimsbf |
| } | | |

FIG 12

Example values: Video@ 50 fps, Audio @ 48 kHz with 1024 sample granules, Timestamps timebase 90 kHz (one video frame duration equals 1800 timebase ticks, one audio granule equals 1920 timebase ticks)
Truncation signaled e.g. in a MHAS packet in a MPEG-H 3D audio bitstream Example values: Video @ 50 fps, Audio @ 48 kHz with 1024 sample granules, Timestamps timebase 90 kHz (one video frame duration equals 1800 timebase ticks, one audio granule equals 1920 timebase ticks) Truncation signaled e.g. in a MHAS packet in a MPEG-H 3D audio bitstream A) Mainstream with splice-out and splice-in point, truncation inactive

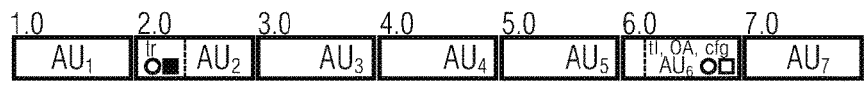

B) Mainstream with Ad-insertion, truncation activated by SB

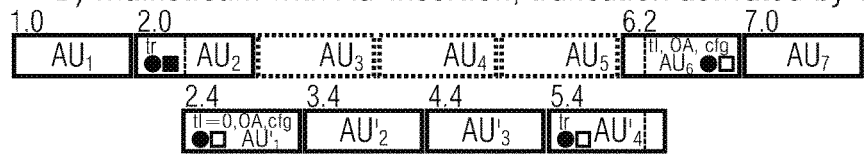

C) Mainstream with splice-out and splice-in point, Cfg-change at splice-in

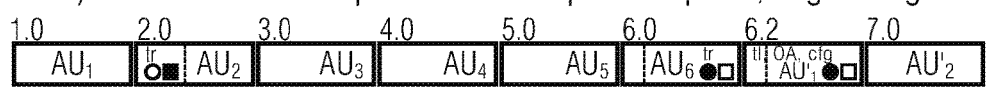

D) Mainstream with Ad-insertion, Cfg-change at splice-in

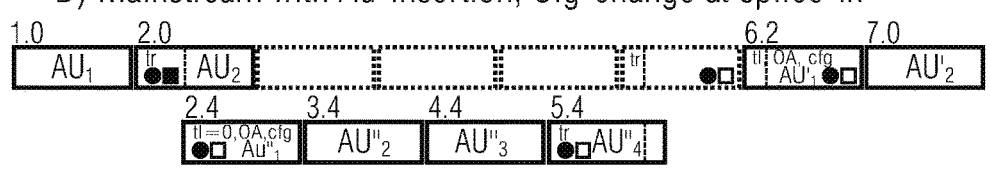

E) Mainstream with splice-out and splice-in point, Cfg-change at splice-out

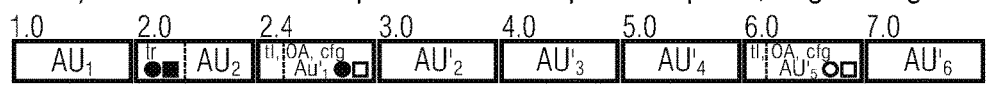

F) Mainstream with Ad-insertion, Cfg-change at splice-out

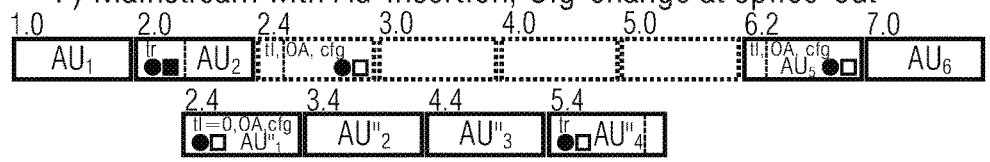

G) Mainstream with splice-out and splice-in continue point, truncation inactive

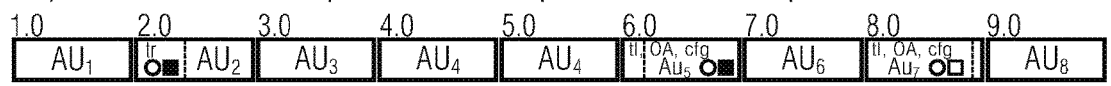

H) Mainstream with 2 Ads in sequence, truncation activated by SB

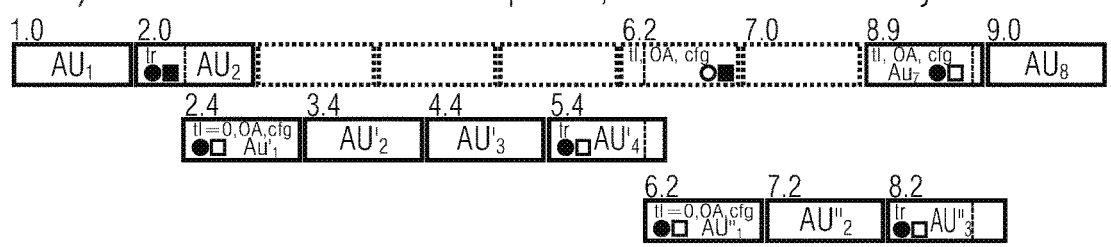

FIG 16A

AUDIO SPLICING CONCEPT

CROSS-REFERENCE TO RELATED APPLICATIONS

This application is a continuation of copending U.S. patent application Ser. No. 17/330,253 filed May 25, 2021, which is a continuation of U.S. patent application Ser. No. 16/712,990, filed Dec. 13, 2019, which in turn is a continuation of copending U.S. patent application Ser. No. 15/452,190, filed Mar. 7, 2017, which in turn is a continuation of copending International Application No. PCT/EP2015/070493, filed Sep. 8, 2015, which is incorporated herein by reference in its entirety, and additionally claims priority from European Applications Nos. EP 14 184 141.1, filed Sep. 9, 2014, and 15 154 752.8, filed Feb. 11, 2015, both of which are incorporated herein by reference in their entirety.

The present application is concerned with audio splicing.

BACKGROUND OF THE INVENTION

Coded audio usually comes in chunks of samples, often 1024, 2048 or 4096 samples in number per chunk. Such chunks are called frames in the following. In the context of MPEG audio codecs like AAC or MPEG-H 3D Audio, these chunks/frames are called granules, the encoded chunks/frames are called access units (AU) and the decoded chunks are called composition units (CU). In transport systems the audio signal is only accessible and addressable in granularity of these coded chunks (access units). It would be favorable, however, to be able to address the audio data at some final granularity, especially for purposes like stream splicing or changes of the configuration of the coded audio data, synchronous and aligned to another stream such as a video stream, for example.

What is known so far is the discarding of some samples of a coding unit. The MPEG-4 file format, for example, has so-called edit lists that can be used for the purpose of discarding audio samples at the beginning and the end of a coded audio file/bitstream [3]. Disadvantageously, this edit list method works only with the MPEG-4 file format, i.e. is file format specific and does not work with stream formats like MPEG-2 transport streams. Beyond that, edit lists are deeply embedded in the MPEG-4 file format and accordingly cannot be easily modified on the fly by stream splicing devices. In AAC [1], truncation information may be inserted into the data stream in the form of extension_payload. Such extension_payload in a coded AAC access unit is, however, disadvantageous in that the truncation information is deeply embedded in the AAC AU and cannot be easily modified on the fly by stream splicing devices.

SUMMARY

According to an embodiment, a spliceable audio data stream may have: a sequence of payload packets, each of the payload packets belonging to a respective one of a sequence of access units into which the spliceable audio data stream is partitioned, each access unit being associated with a respective one of audio frames of an audio signal which is encoded into the spliceable audio data stream in units of the audio frames; and a truncation unit packet inserted into the spliceable audio data stream and being settable so as to indicate, for a predetermined access unit, an end portion of an audio frame with which the predetermined access unit is associated, as to be discarded in playout.

According to another embodiment, a spliced audio data stream may have: a sequence of payload packets, each of the payload packets belonging to a respective one of a sequence of access units into which the spliced audio data stream is partitioned, each access unit being associated with a respective one of audio frames; a truncation unit packet inserted into the spliced audio data stream and indicating an end portion of an audio frame with which a predetermined access unit is associated, as to be discarded in playout, wherein in a first subsequence of payload packets of the sequence of payload packets, each payload packet belongs to an access unit of a first audio data stream having encoded thereinto a first audio signal in units of audio frames of the first audio signal, and the access units of the first audio data stream including the predetermined access unit, and in a second subsequence of payload packets of the sequence of payload packets, each payload packet belongs to access units of a second audio data stream having encoded thereinto a second audio signal in units of audio frames of the second audio data stream, wherein the first and the second subsequences of payload packets are immediately consecutive with respect to each other and abut each other at the predetermined access unit and the end portion is a trailing end portion in case of the first subsequence preceding the second subsequence and a leading end portion in case of the second subsequence preceding the first subsequence.

According to yet another embodiment, a stream splicer for splicing audio data streams may have: a first audio input interface for receiving a first audio data stream including a sequence of payload packets, each of which belongs to a respective one of a sequence of access units into which the first audio data stream is partitioned, each access unit of the first audio data stream being associated with a respective one of audio frames of a first audio signal which is encoded into the first audio data stream in units of audio frames of the first audio signal; a second audio input interface for receiving a second audio data stream including a sequence of payload packets, each of which belongs to a respective one of a sequence of access units into which the second audio data stream is partitioned, each access unit of the second audio data stream being associated with a respective one of audio frames of a second audio signal which is encoded into the second audio data stream in units of audio frames of the second audio signal; a splice point setter; and a splice multiplexer, wherein the first audio data stream further has a truncation unit packet inserted into the first audio data stream and being settable so as to indicate for a predetermined access unit, an end portion of an audio frame with which a predetermined access unit is associated, as to be discarded in playout, and the splice point setter is configured to set the truncation unit packet so that the truncation unit packet indicates an end portion of the audio frame with which the predetermined access unit is associated, as to be discarded in playout, or the splice point setter is configured to insert a truncation unit packet into the first audio data stream and sets same so as to indicate for a predetermined access unit, an end portion of an audio frame with which a predetermined access unit is associated, as to be discarded in playout set the truncation unit packet so that the truncation unit packet indicates an end portion of the audio frame with which the predetermined access unit is associated, as to be discarded in playout; and wherein the splice multiplexer is configured to cut the first audio data stream at the predetermined access unit so as to acquire a subsequence of payload packets of the first audio data stream within which each payload packet belongs to a respective access unit of a run of access units of the first audio data stream including the predetermined access unit, and splice the subsequence of payload packets of the first audio data stream and the sequence of payload packets of the second audio data stream so that same are immediately consecutive with respect to each other and abut each other at the predetermined access unit, wherein the end portion of the audio frame with which the predetermined access unit is associated is a trailing end portion in case of the subsequence of payload packets of the first audio data stream preceding the sequence of payload packets of the second audio data stream and a leading end portion in case of the subsequence of payload packets of the first audio data stream succeeding the sequence of payload packets of the second audio data stream.

According to yet another embodiment, an audio decoder may have: an audio decoding core configured to reconstruct an audio signal, in units of audio frames of the audio signal, from a sequence of payload packets of an audio data stream, wherein each of the payload packets belongs to a respective one of a sequence of access units into which the audio data stream is partitioned, wherein each access unit is associated with a respective one of the audio frames; and an audio truncator configured to be responsive to a truncation unit packet inserted into the audio data stream so as to truncate an audio frame associated with a predetermined access unit so as to discard, in playing out the audio signal, an end portion thereof indicated to be discarded in playout by the truncation unit packet.

According to still another embodiment, an audio encoder may have: an audio encoding core configured to encode an audio signal, in units of audio frames of the audio signal, into payload packets of an audio data stream so that each payload packet belongs to a respective one of access units into which the audio data stream is partitioned, each access unit being associated with a respective one of the audio frames, and a truncation packet inserter configured to insert into the audio data stream a truncation unit packet being settable so as to indicate an end portion of an audio frame with which a predetermined access unit is associated, as being to be discarded in playout.

According to another embodiment, a method for splicing audio data streams including a first audio data stream including a sequence of payload packets, each of which belongs to a respective one of a sequence of access units into which the first audio data stream is partitioned, each access unit of the first audio data stream being associated with a respective one of audio frames of a first audio signal which is encoded into the first audio data stream in units of audio frames of the first audio signal; and a second audio data stream including a sequence of payload packets, each of which belongs to a respective one of a sequence of access units into which the second audio data stream is partitioned, each access unit of the second audio data stream being associated with a respective one of audio frames of a second audio signal which is encoded into the second audio data stream in units of audio frames of the second audio signal; wherein the first audio data stream further has a truncation unit packet inserted into the first audio data stream and being settable so as to indicate for a predetermined access unit, an end portion of an audio frame with which a predetermined access unit is associated, as to be discarded in playout, and the method may have the step of: setting the truncation unit packet so that the truncation unit packet indicates an end portion of the audio frame with which the predetermined access unit is associated, as to be discarded in playout, or the method may have the step of inserting a truncation unit packet into the first audio data stream and sets same so as to indicate for a predetermined access unit, an end portion of an audio frame with which a predetermined access unit is associated, as to be discarded in playout and setting the truncation unit packet so that the truncation unit packet indicates an end portion of the audio frame with which the predetermined access unit is associated, as to be discarded in playout; and the method further may have the steps of: cutting the first audio data stream at the predetermined access unit so as to acquire a subsequence of payload packets of the first audio data stream within which each payload packet belongs to a respective access unit of a run of access units of the first audio data stream including the predetermined access unit, and splicing the subsequence of payload packets of the first audio data stream and the sequence of payload packets of the second audio data stream so that same are immediately consecutive with respect to each other and abut each other at the predetermined access unit, wherein the end portion of the audio frame with which the predetermined access unit is associated is a trailing end portion in case of the subsequence of payload packets of the first audio data stream preceding the sequence of payload packets of the second audio data stream and a leading end portion in case of the subsequence of payload packets of the first audio data stream succeeding the sequence of payload packets of the second audio data stream.

According to another embodiment, an audio decoding method may have the steps of: reconstructing an audio signal, in units of audio frames of the audio signal, from a sequence of payload packets of an audio data stream, wherein each of the payload packets belongs to a respective one of a sequence of access units into which the audio data stream is partitioned, wherein each access unit is associated with a respective one of the audio frames; and responsive to a truncation unit packet inserted into the audio data stream, truncating an audio frame associated with a predetermined access unit so as to discard, in playing out the audio signal, an end portion thereof indicated to be discarded in playout by the truncation unit packet.

According to another embodiment, an audio encoding method may have the steps of: encoding an audio signal, in units of audio frames of the audio signal, into payload packets of an audio data stream so that each payload packet belongs to a respective one of access units into which the audio data stream is partitioned, each access unit being associated with a respective one of the audio frames, and inserting into the audio data stream a truncation unit packet being settable so as to indicate an end portion of an audio frame with which a predetermined access unit is associated, as being to be discarded in playout.

Another embodiment may have a non-transitory digital storage medium having a computer program stored thereon to perform the inventive methods when said computer program is run by a computer.

The invention of the present application is inspired by the idea that audio splicing may be rendered more effectively by the use of one or more truncation unit packets inserted into the audio data stream so as to indicate to an audio decoder, for a predetermined access unit, an end portion of an audio frame with which the predetermined access unit is associated, as to be discarded in playout.

In accordance with an aspect of the present application, an audio data stream is initially provided with such a truncation unit packet in order to render the thus provided audio data stream more easily spliceable at the predetermined access unit at a temporal granularity finer than the audio frame length. The one or more truncation unit packets are, thus, addressed to audio decoder and stream splicer, respectively. In accordance with embodiments, a stream splicer simply searches for such a truncation unit packet in order to locate a possible splice point. The stream splicer sets the truncation unit packet accordingly so as to indicate an end portion of the audio frame with which the predetermined access unit is associated, to be discarded in playout, cuts the first audio data stream at the predetermined access unit and splices the audio data stream with another audio data stream so as to abut each other at the predetermined access unit. As the truncation unit packet is already provided within the spliceable audio data stream, no additional data is to be inserted by the splicing process and accordingly, bitrate consumption remains unchanged insofar.

Alternatively, a truncation unit packet may be inserted at the time of splicing. Irrespective of initially providing an audio data stream with a truncation unit packet or providing the same with a truncation unit packet at the time of splicing, a spliced audio data stream has such truncation unit packet inserted thereinto with the end portion being a trailing end portion in case of the predetermined access unit being part of the audio data stream leading the splice point and a leading end portion in case of the predetermined access unit being part of the audio data stream succeeding the splice point.

BRIEF DESCRIPTION OF THE DRAWINGS

Embodiments of the present invention will be detailed subsequently referring to the appended drawings, in which:

FIG. 12 shows an example of a syntax of TU packet;

FIG. 16a-b shows different cases of using splicing in accordance with an embodiment.

DETAILED DESCRIPTION OF THE INVENTION

Figure 1:
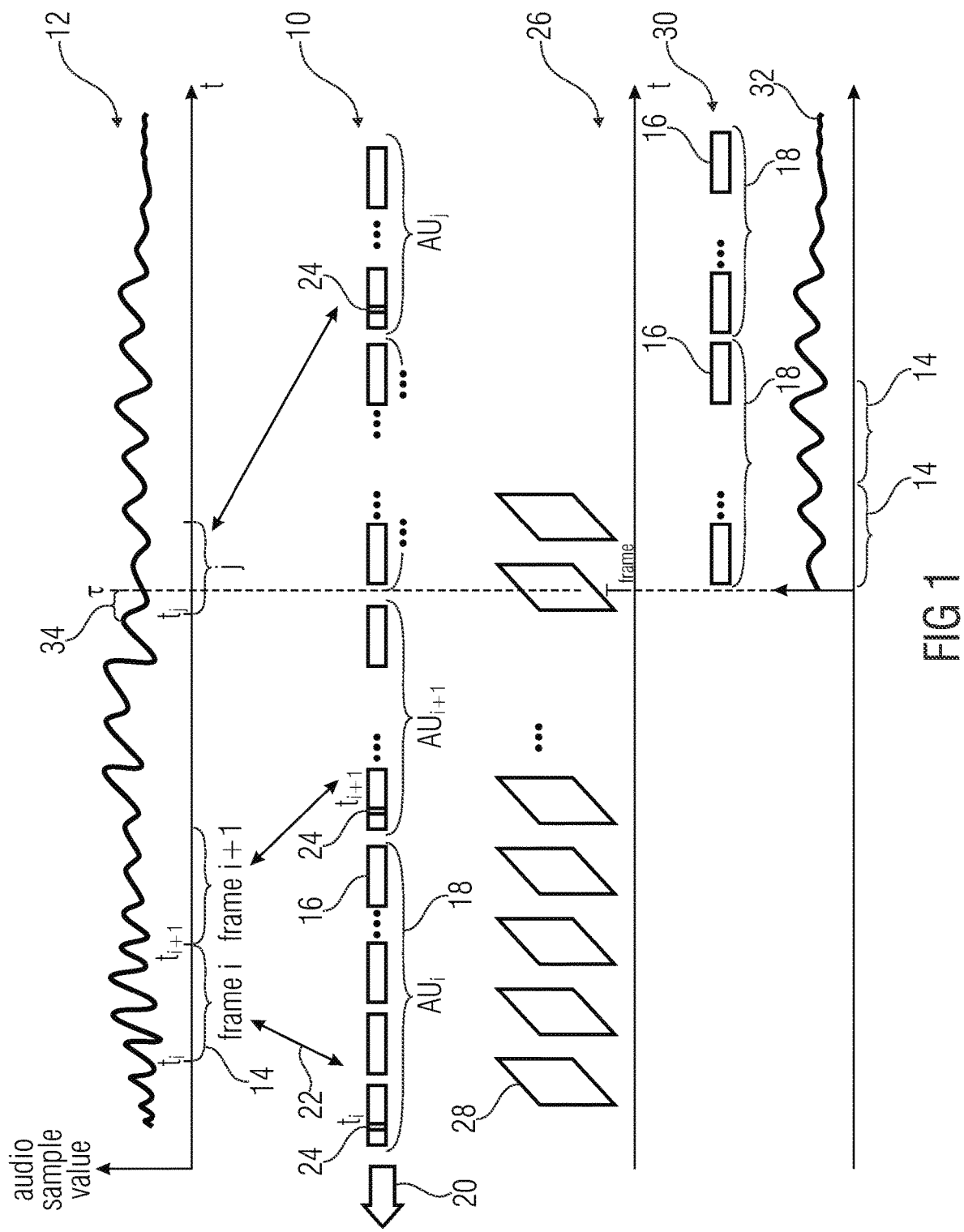
FIG. 1 schematically shows from top to bottom an audio signal, the audio data stream having the audio signal encoded thereinto in units of audio frames of the audio signal, a video consisting of a sequence of frames and another audio data stream and its audio signal encoded thereinto which are to potentially replace the initial audio signal from a certain video frame onwards.

FIG. 1 shows an exemplary portion out of an audio data stream in order to illustrate the problems occurring when trying to splice the respective audio data stream with another audio data stream. Insofar, the audio data stream of FIG. 1 forms a kind of basis of the audio data streams shown in the subsequent figures. Accordingly, the description brought forward with the audio data stream of FIG. 1 is also valid for the audio data streams described further below.

The audio data stream of FIG. 1 is generally indicated using reference sign 10. The audio data stream has encoded there into an audio signal 12. In particular, the audio signal 12 is encoded into audio data stream in units of audio frames 14, i.e. temporal portions of the audio signal 12 which may, as illustrated in FIG. 1, be non-overlapping and abut each other temporally, or alternatively overlap each other. The way the audio signal 12 is, in units of the audio frames 14, encoded audio data stream 10 may be chosen differently: transform coding may be used in order to encode the audio signal in the units of the audio frames 14 into data stream 10. In that case, one or several spectral decomposition transformations may be applied onto the audio signal of audio frame 14, with one or more spectral decomposition transforms temporally covering the audio frame 14 and extending beyond its leading and trailing end. The spectral decomposition transform coefficients are contained within the data stream so that the decoder is able to reconstruct the respective frame by way of inverse transformation. The mutually and even beyond audio frame boundaries overlapping transform portions in units of which the audio signal is spectrally decomposed are windowed with so called window functions at encoder and/or decoder side so that a so-called overlap-add process at the decoder side according to which the inversely transformed signaled spectral composition transforms are overlapped with each other and added, reveals the reconstruction of the audio signal 12.

Alternatively, for example, the audio data stream 10 has audio signal 12 encoded thereinto in units of the audio frames 14 using linear prediction, according to which the audio frames are coded using linear prediction coefficients and the coded representation of the prediction residual using, in turn, long term prediction (LTP) coefficients like LTP gain and LTP lag, codebook indices and/or a transform coding of the excitation (residual signal). Even here, the reconstruction of an audio frame 14 at the decoding side may depend on a coding of a preceding frame or into, for example, temporal predictions from one audio frame to another or the overlap of transform windows for transform coding the excitation signal or the like. The circumstance is mentioned here, because it plays a role in the following description.

For transmission and network handling purposes, the audio data stream 10 is composed of a sequence of payload packets 16. Each of the payload packets 16 belongs to a respective one of the sequence of access units 18 into which the audio data stream 10 is partitioned along stream order 20. Each of the access units 18 is associated with a respective one of the audio frames 14 as indicated by double-headed arrows 22 in FIG. 1. As illustrated in FIG. 1, the temporal order of the audio frames 14 may coincide with the order of the associated audio frames 18 in data stream 10: an audio frame 14 immediately succeeding another frame may be associated with an access unit in data stream 10 immediately succeeding the access unit of the other audio frame in data stream 10.

That is, as depicted in FIG. 1, each access unit 18 may have one or more payload packets 16. The one or more payload packets 16 of a certain access unit 18 has/have encoded thereinto the aforementioned coding parameters describing the associated frame 14 such as spectral decomposition transform coefficients, LPCs, and/or a coding of the excitation signal.

The audio data stream 10 may also comprise timestamp information 24 which indicates for each access unit 18 of the data stream 10 this timestamp $t_i$ at which the audio frame i with which the respective access unit 18 $AU_i$ is associated, is to be played out. The timestamp information 24 may, as illustrated in FIG. 1, be inserted into one of the one or more packets 16 of each access unit 18 so as to indicate the timestamp of the associated audio frame, but different solutions are feasible as well, such as the insertion of the timestamp information $t_i$ of an audio frame i into each of the one or more packets of the associated access unit $AU_i$.

Owing to the packetization, the access unit partitioning and the timestamp information 24, the audio data stream 10 is especially suitable for being streamed between encoder and decoder. That is, the audio data stream 10 of FIG. 1 is an audio data stream of the stream format. The audio data stream of FIG. 1 may, for instance, be an audio data stream according to MPEG-H 3D Audio or MHAS [2].

In order to ease the transport/network handling, packets 16 may have byte-aligned sizes and packets 16 of different types may be distinguished. For example, some packets 16 may relate to a first audio channel or a first set of audio channels and have a first packet type associated therewith, while packets having another packet type associated therewith have encoded thereinto another audio channel or another set of audio channels of audio signal 12 encoded thereinto. Even further packets may be of a packet type carrying seldom changing data such as configuration data, coding parameters being valid, or being used by, sequence of access units. Even other packets 16 may be of a packet type carrying coding parameters valid for the access unit to which they belong, while other payload packets carry codings of samples values, transform coefficients, LPC coefficients, or the like. Accordingly, each packet 16 may have a packet type indicator therein which is easily accessible by intermediate network entities and the decoder, respectively. The TU packets described hereinafter may be distinguishable from the payload packets by packet type.

As long as the audio data stream 10 is transmitted as it is, no problem occurs. However, imagine that the audio signal 12 is to be played out at decoding side until some point in time exemplarily indicated by $\tau$ in FIG. 1, only. FIG. 1 illustrates, for example, that this point in time $\tau$ may be determined by some external clock such as a video frame clock. FIG. 1, for instance, illustrates at 26 a video composed of a sequence of frames 28 in a time-aligned manner with respect to the audio signal 12, one above the other. For instance, the timestamp $T_{frame}$ could be the timestamp of the first picture of a new scene, new program or the like, and accordingly it could be desired that the audio signal 12 is cut at that time $\tau=T_{frame}$ and replaced by another audio signal 12 from that time onwards, representing, for instance, the tone signal of the new scene or program. FIG. 1, for instance, illustrates an already existing audio data stream 30 constructed in the same manner as audio data stream 10, i.e. using access units 18 composed of one or more payload packets 16 into which the audio signal 32 accompanying or describing the sequence of pictures of frames 28 starting at timestamp $T_{frame}$ in audio frames 14 in such a manner that the first audio frame 14 has its leading end coinciding with time timestamp $T_{frame}$, i.e. the audio signal 32 is to be played out with the leading end of frame 14 registered to the playout of timestamp $T_{frame}$.

Disadvantageously, however, the frame rate of frames 14 of audio data stream 10 is completely independent from the frame rate of video 26. It is accordingly completely random where within a certain frame 14 of the audio signal 12 $\tau=T_{frame}$ falls into. That is, without any additional measure, it would merely be possible to completely leave off access unit $AU_i$ associated with the audio frame 14, j, within which $\tau$ lies, and appending at the predecessor access unit $AU_{j-1}$ of audio data stream 10 the sequence of access units 18 of audio data stream 30, thereby however causing a mute in the leading end portion 34 of audio frame j of audio signal 12.

The various embodiments described hereinafter overcome the deficiency outlined above and enable a handling of such splicing problems.

Figure 2:
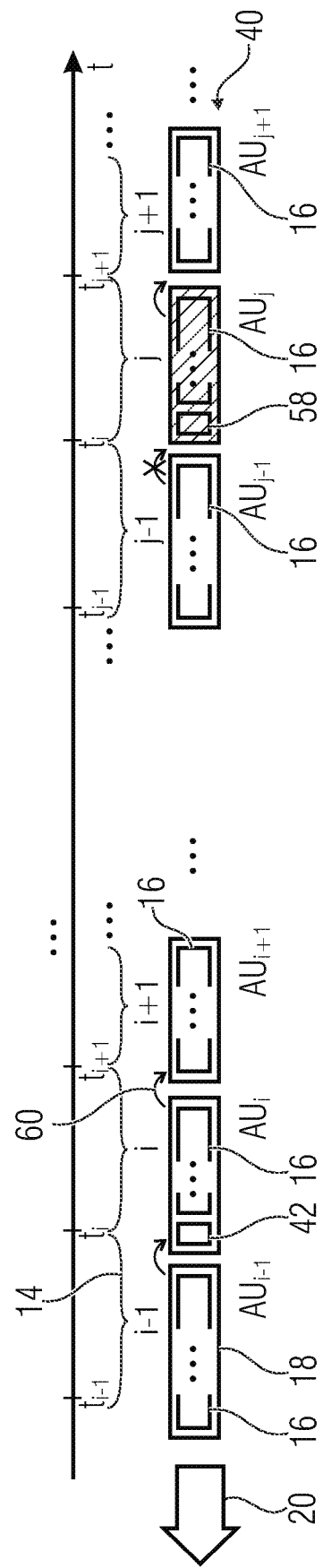
FIG. 2 shows a schematic diagram of a spliceable audio data stream, i.e. an audio data stream provided with TU packets in order to alleviate splicing actions, in accordance with an embodiment of the present application.

FIG. 2 shows an audio data stream in accordance with an embodiment of the present application. The audio data stream of FIG. 2 is generally indicated using reference sign 40. Primarily, the construction of the audio signal 40 coincides with the one explained above with respect to the audio data stream 10, i.e. the audio data stream 40 comprises a sequence of payload packets, namely one or more for each access unit 18 into which the data stream 40 is partitioned. Each access unit 18 is associated with a certain one of the audio frames of the audio signal which is encoded into data stream 40 in the units of the audio frames 14. Beyond this, however, the audio data stream 40 has been "prepared" for being spliced within an audio frame with which any predetermined access unit is associated. Here, this is exemplarily access unit $AU_i$ and access unit $AU_j$. Let us refer to access unit $AU_i$ first. In particular, the audio data stream 40 is rendered "spliceable" by having a truncation unit packet 42 inserted thereinto, the truncation unit packet 42 being settable so as to indicate, for access unit $AU_i$, an end portion of the associated audio frame i as to be discarded out in playout. The advantages and effects of the truncation unit packet 42 will be discussed hereinafter. Some preliminary notes, however, shall be made with respect to the positioning of the truncation unit packet 42 and the content thereof. For example, although FIG. 2 shows truncation unit packet 42 as being positioned within the access unit $AU_i$, i.e. the one the end portion of which truncation unit packet 42 indicates, truncation unit packet 42 may alternatively be positioned in any access unit preceding access unit $AU_i$. Likewise, even if the truncation unit packet 42 is within access unit $AU_i$, access unit 42 is not required to be the first packet in the respective access unit $AU_i$ as exemplarily illustrated FIG. 2.

Figure 3:
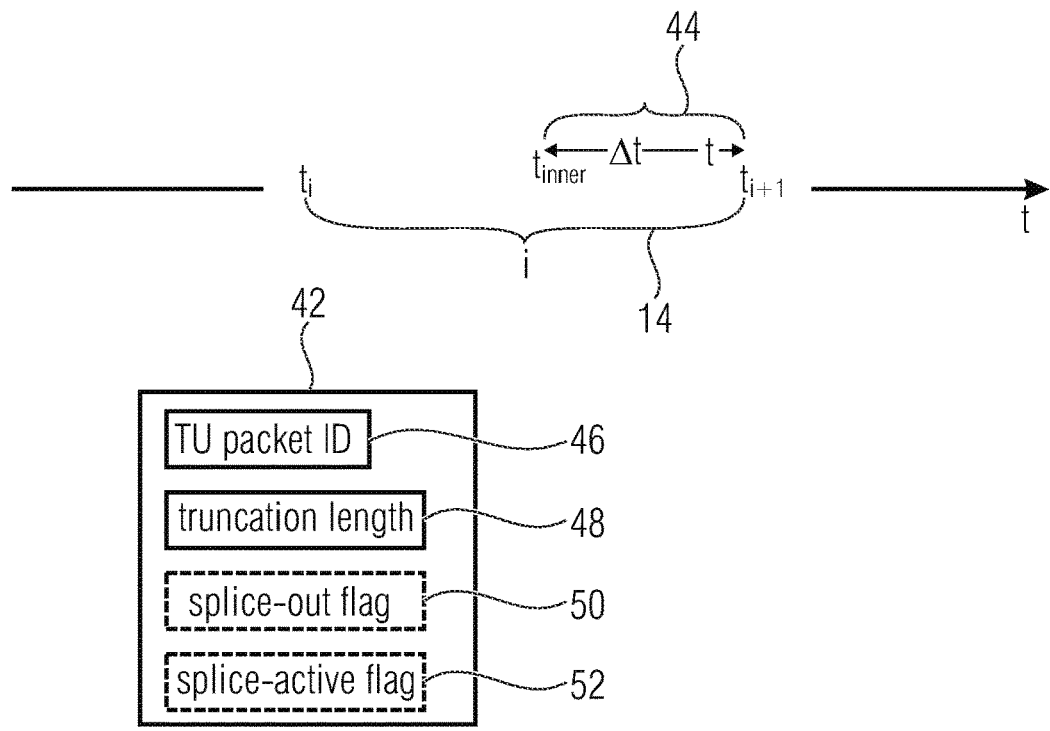
FIG. 3 shows a schematic diagram illustrating a TU packet in accordance with an embodiment.

In accordance with an embodiment which is illustrated in FIG. 3, the end portion indicated by truncation unit packet 42 is a trailing end portion 44, i.e. a portion of frame 14 extending from some time instant tanner within the audio frame 14 to the trailing end of frame 14. In other words, in accordance with the embodiment of FIG. 3, there is no syntax element signaling whether the end portion indicated by truncation unit packet 42 shall be a leading end portion or a trailing end portion. However, the truncation unit packet 42 of FIG. 3 comprises a packet type index 46 indicating that the packet 42 is a truncation unit packet, and a truncation length element 48 indicating a truncation length, i.e. the temporal length Δt of trailing end portion 44. The truncation length 48 may measure the length of portion 44 in units of individual audio samples, or in n-tuples of consecutive audio samples with n being greater than one and being, for example, smaller than N samples with N being the number of samples in frame 14.

It will be described later that the truncation unit packet 42 may optionally comprise one or more flags 50 and 52. For example, flag 50 could be a splice-out flag indicating that the access unit $AU_i$ for which the truncation unit packet 42 indicates the end portion 44, is prepared to be used as a splice-out point. Flag 52 could be a flag dedicated to the decoder for indicating whether the current access unit $AU_i$ has actually been used as a splice-out point or not. However, flags 50 and 52 are, as just outlined, merely optional. For example, the presence of TU packet 42 itself could be a signal to stream splicers and decoders that the access unit to which the truncation unit 42 belongs is such a access unit suitable for splice-out, and a setting of truncation length 48 to zero could be an indication to the decoder that no truncation is to be performed and no splice-out, accordingly.

The notes above with respect to TU packet 42 are valid for any TU packet such as TU packet 58.

As will be described further below, the indication of a leading end portion of an access unit may be needed as well. In that case, a truncation unit packet such as TU packet 58, may be settable so as to indicate a trailing end portion as the one depicted in FIG. 3. Such a TU packet 58 could be distinguished from leading end portion truncation unit packets such as 42 by means of the truncation unit packet's type index 46. In other words, different packet types could be associated with TU packets 42 indicating trailing end portions and TU packets being for indicating leading end portions, respectively.

Figure 4:
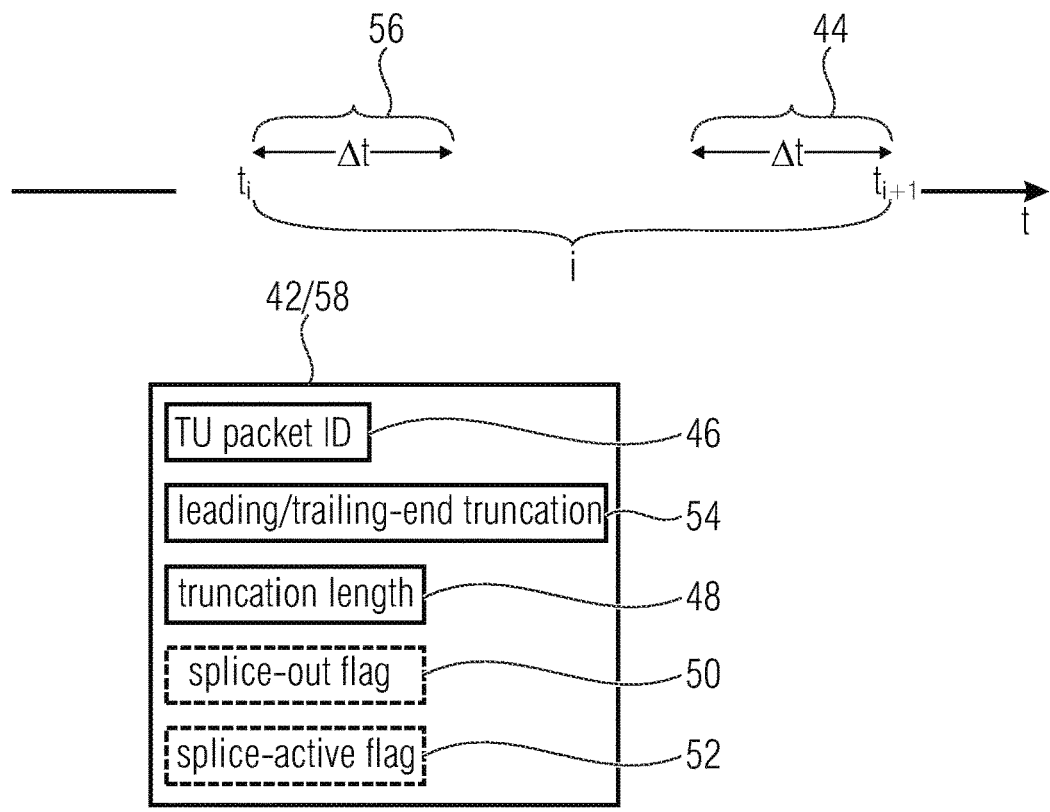
FIG. 4 schematically shows a TU packet in accordance with an alternative embodiment according to which the TU packet is able to signal a leading end portion and a trailing end portion, respectively.

For the sake of completeness, FIG. 4 illustrates a possibility according to which truncation unit packet 42 comprises, in addition to the syntax elements shown in FIG. 3, a leading/trailing indicator 54 indicating whether the truncation length 48 is measured from the leading end or the trailing end of audio frame i towards the inner of audio frame i, i.e. whether the end portion, the length of which is indicated by truncation length 48 is a trailing end portion 44 or a leading end portion 56. The TU packets' packet type would be the same then.

As will be outlined in more detail below, the truncation unit packet 42 renders access unit $AU_i$ suitable for a splice-out since it is feasible for stream splicers described further below to set the trailing end portion 44 such that from the externally defined splice-out time τ (compare FIG. 1) on, the playout of the audio frame i is stopped. From that time on, the audio frames of the spliced-in audio data stream may be played out.

However, FIG. 2 also illustrates a further truncation unit packet 58 as being inserted into the audio data stream 40, this further truncation unit packet 58 being settable so as to indicate for access unit $AU_j$, with j>i, that an end portion thereof is to be discarded in playout. This time, however, the access unit $AU_j$, i.e. access unit $AU_{j+1}$, has encoded thereinto its associated audio frame j in a manner independent from the immediate predecessor access unit $AU_{j-1}$, namely in that no prediction references or internal decoder registers are to be set dependent on the predecessor access unit $AU_{j-1}$, or in that no overlap-add process renders a reconstruction of the access unit $AU_{j-1}$ a requirement for correctly reconstructing and playing-out access unit $AU_j$. In order to distinguish access unit $AU_j$, which is an immediate playout access unit, from the other access units which suffer from the above-outlined access unit interdependencies such as, inter alias, $AU_i$, access unit $AU_j$ is highlighted using hatching.

FIG. 2 illustrates the fact that the other access units shown in FIG. 2 have their associated audio frame encoded thereinto in a manner so that their reconstruction is dependent on the immediate predecessor access unit in the sense that correct reconstruction and playout of the respective audio frame on the basis of the associated access unit is merely feasible in the case of having access to the immediate predecessor access unit, as illustrated by small arrows 60 pointing from predecessor access unit to the respective access unit. In the case of access unit $AU_j$, the arrow pointing from the immediate predecessor access unit, namely $AU_{j-1}$, to access unit $AU_j$ is crossed-out in order to indicate the immediate-playout capability of access unit $AU_j$. For example, in order to provide for this immediate playout capability, access unit $AU_j$ has additional data encoded therein, such as initialization information for initializing internal registers of the decoder, data allowing for an estimation of aliasing cancelation information usually provided by the temporally overlapping portion of the inverse transforms of the immediate predecessor access unit or the like.

The capabilities of access units $AU_i$ and $AU_j$ are different from each other: access unit $AU_i$ is, as outlined below, suitable as a splice-out point owing to the presence of the truncation unit packet 42. In other words, a stream splicer is able to cut the audio data stream 40 at access unit $AU_i$ so as to append access units from another audio data stream, i.e. a spliced-in audio data stream.

This is feasible at access unit $AU_j$ as well, provided that TU packet 58 is capable of indicating a trailing end portion 44. Additionally or alternatively, truncation unit packet 58 is settable to indicate a leading end portion, and in that case access unit $AU_j$ is suitable to serve as a splice-(back-)in occasion. That is, truncation unit packet 58 may indicate a leading end portion of audio frame j not to be played out and until that point in time, i.e. until the trailing end of this trailing end portion, the audio signal of the (preliminarily) spliced-in audio data stream may be played-out.

For example, the truncation unit packet 42 may have set splice-out flag 50 to zero, while the splice-out flag 50 of truncation unit packet 58 may be set to zero or may be set to 1. Some explicit examples will be described further below such as with respect to FIG. 16.

It should be noted that there is no need for the existence of a splice-in capable access unit $AU_j$. For example, the audio data stream to be spliced-in could be intended to replace the play-out of audio data stream 40 completely from time instant τ onwards, i.e. with no splice-(back-)in taking place to audio data stream 40. However, if the audio data stream to be spliced-in is to replace the audio data stream's 40 audio signal merely preliminarily, then a splice-in back to the audio data stream 40 may be used, and in that case, for any splice-out TU packet 42 there should be a splice-in TU packet 58 which follows in data stream order 20.

Figure 5:
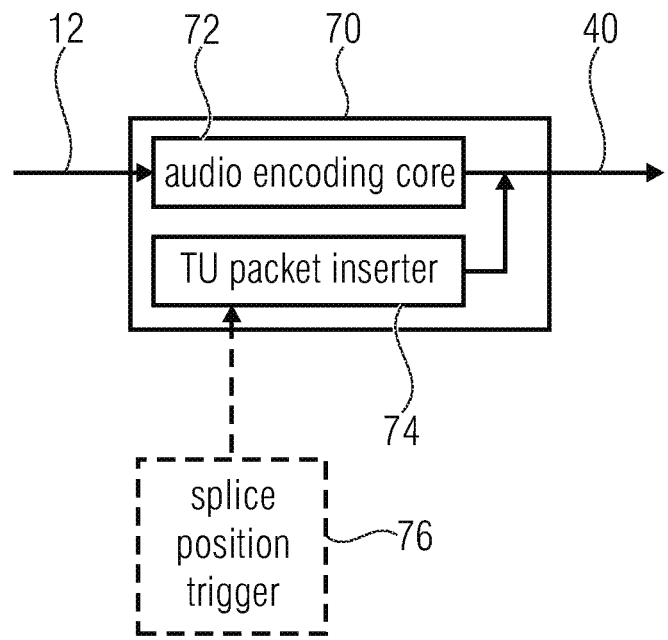
FIG. 5 shows a block diagram of an audio encoder in accordance with an embodiment.

FIG. 5 shows an audio encoder 70 for generating the audio data stream 40 of FIG. 2. The audio encoder 70 comprises an audio encoding core 72 and a truncation packet inserter 74. The audio encoding core 72 is configured to encode the audio signal 12 which enters the audio encoding core 72 in units of the audio frames of the audio signal, into the payload packets of the audio data stream 40 in a manner having been described above with respect to FIG. 1, for example. That is, the audio encoding core 72 may be a transform coder encoding the audio signal 12 using a lapped transform, for example, such as an MDCT, and then coding the transform coefficients, wherein the windows of the lapped transform may, as described above, cross frame boundaries between consecutive audio frames, thereby leading to an interdependency of immediately consecutive audio frames and their associated access units. Alternatively, the audio encoder core 72 may use linear prediction based coding so as to encode the audio signal 12 into data stream 40. For example, the audio encoding core 72 encodes linear prediction coefficients describing the spectral envelope of the audio signal 12 or some pre-filtered version thereof on an at least frame-by-frame basis, with additionally coding the excitation signal. Continuous updates of predictive coding or lapped transform issues concerning the excitation signal coding may lead to the interdependencies between immediately consecutive audio frames and their associated access units. Other coding principles are, however, imaginable as well.

The truncation unit packet inserter 74 inserts into the audio data stream 40 the truncation unit packets such as 42 and 58 in FIG. 2. As shown in FIG. 5, TU packet inserter 74 may, to this end, be responsive to a splice position trigger 76. For example, the splice position trigger 76 may be informed of scene or program changes or other changes in a video, i.e. within the sequence of frames, and may accordingly signal to the truncation unit packet inserter 74 any first frame of such new scene or program. The audio signal 12, for example, continuously represents the audio accompaniment of the video for the case that, for example, none of the individual scenes or programs in the video are replaced by other frame sequences or the like. For example, imagine that a video represents a live soccer game and that the audio signal 12 is the tone signal related thereto. Then, splice position trigger 76 may be operated manually or automatically so as to identify temporal portions of the soccer game video which are subject to potential replacement by ads, i.e. ad videos, and accordingly, trigger 76 would signal beginnings of such portions to TU packet inserter 74 so that the latter may, responsive thereto, insert a TU packet 42 at such a position, namely relating to the access unit associated with the audio frame within which the first video frame of the potentially to be replaced portion of the video starts, lies. Further, trigger 76 informs the TU packet inserter 74 on the trailing end of such potentially to be replaced portions, so as to insert a TU packet 58 at a respective access unit associated with an audio frame into which the end of such a portion falls. As far as such TU packets 58 are concerned, the audio encoding core 72 is also responsive to trigger 76 so as to differently or exceptionally encode the respective audio frame into such an access unit $AU_j$ (compare FIG. 2) in a manner allowing immediately playout as described above. In between, i.e. within such potentially to be replaced portions of the video, trigger 76 may intermittently insert TU packets 58 in order to serve as a splice-in point or splice-out point. In accordance with a concrete example, trigger 76 informs, for example, the audio encoder 70 of the timestamps of the first or starting frame of such a portion to be potentially replaced, and the timestamp of the last or end frame of such a portion, wherein the encoder 70 identifies the audio frames and associated access units with respect to which TU packet insertion and, potentially, immediate playout encoding shall take place by identifying those audio frames into which the timestamps received from trigger 76 fall.

Figure 6:
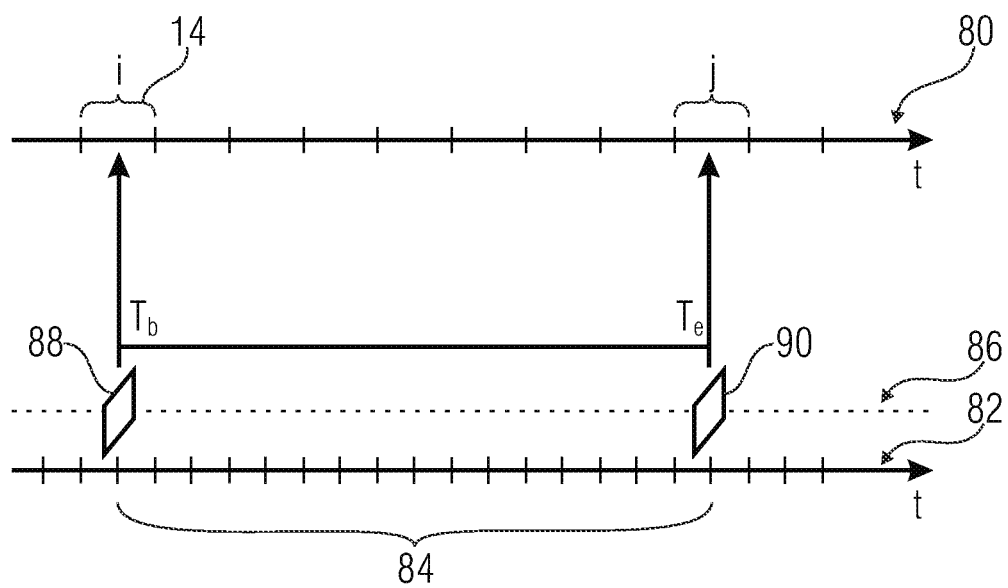
FIG. 6 shows a schematic diagram illustrating a trigger source for splice-in and splice-out time instants in accordance with an embodiment where same depend on a video frame raster.

In order to illustrate this, reference is made to FIG. 6 which shows the fixed frame raster at which audio encoding core 72 works, namely at 80, along with the fixed frame raster 82 of a video to which the audio signal 12 belongs. A portion 84 out of video 86 is indicated using a curly bracket. This portion 84 is for example manually determined by an operator or fully or partially automatically by means of scene detection. The first and the last frames 88 and 90 have associated therewith timestamps $T_b$ and $T_e$, which lie within audio frames i and j of the frame raster 80. Accordingly, these audio frames 14, i.e. i and j, are provided with TU packets by TU packet inserter 74, wherein audio encoding core 72 uses immediate playout mode in order to generate the access unit corresponding to audio frame j.

It should be noted that the TU packet inserter 74 may be configured to insert the TU packets 42 and 58 with default values. For example, the truncation length syntax element 48 may be set to zero. As far as the splice-in flag 50 is concerned, which is optional, same is set by TU packet inserter 74 in the manner outlined above with respect to FIGS. 2 to 4, namely indicating splice-out possibility for TU packets 42 and for all TU packets 58 besides those registered with the final frame or image of video 86. The splice-active flag 52 would be set to zero since no splice has been applied so far.

It is noted with respect to the audio encoder of FIG. 6, that the way of controlling the insertion of TU packets, i.e. the way of selecting the access units for which insertion is performed, as explained with respect to FIGS. 5 and 6 is illustrative only and other ways of determining those access units for which insertion is performed is feasible as well. For example, each access unit, every N-th (N>2) access unit or each IPF access unit could alternatively be provided with a corresponding TU packet.

It has not been explicitly mentioned above, but the TU packets may be coded in uncompressed form so that a bit consumption (coding bitrate) of a respective TU packet is independent from the TU packet's actual setting. Having said this, it is further worthwhile to note that the encoder may, optionally, comprise a rate control (not shown in FIG. 5), configured to log a fill level of a coded audio buffer so as to get sure that a coded audio buffer at the decoder's side at which the data stream 40 is received neither underflows, thereby resulting in stalls, nor overflows thereby resulting in loss of packets 12. The encoder may, for example, control/vary a quantization step size in order to obey the fill level constraint while optimizing some rate/distortion measure. In particular, the rate control may estimate the decoder's coded audio buffer's fill level assuming a predetermined transmission capacity/bitrate which may be constant or quasi constant and, for example, be preset by an external entity such as a transmission network. The coding rate of the TU packets of data stream 40 are taken into account by the rate control. Thus, in the form shown in FIG. 2, i.e. in the version generated by encoder 70, the data stream 40 keeps the preset bitrate with varying, however, therearound in order to compensate for the varying coding complexity if the audio signal 12 in terms of its rate/distortion ratio with neither overloading the decoder's coded audio fill level (leading to overflow) nor derating the same (leading to underflow). However, as has already been briefly outlined above, and will be described in more detail below, every splice-out access unit $AU_i$ is, accordance to embodiments, supposed to contribute to the playout at decoder side merely for a temporal duration smaller than the temporal length of its audio frame i. As will get clear from the description brought forward below, the (leading) access unit of a spliced-in audio data stream spliced with data stream 40 at the respective splice-out AU such as $AU_i$ as a splice interface, will displace the respective splice-out AU's successor AUs. Thus, from that time onwards, the bitrate control performed within encoder 70 is obsolete. Beyond that, said leading AU may be coded in a self-contained manner so as to allow immediate playout, thereby consuming more coded bitrate compared to non-IPF AUs. Thus, in accordance with an embodiment, the encoder 70 plans or schedules the rate control such that the logged fill level at the respective splice-out AU's end, i.e. at its border to the immediate successor AU, assumes, for example, a predetermined value such as for example, ¼ or a value between ¾ and ⅛ of the maximum fill level. By this measure, other encoders preparing the audio data streams supposed to be spliced in into data stream 40 at the splice-out AUs of data stream 40 may rely on the fact that the decoder's coded audio buffer fill level at the time of starting to receive their own AUs (in the following sometimes distinguished from the original ones by an apostrophe) is at the predetermined value so that these other encoders may further develop the rate control accordingly. The description brought forward so far concentrated on splice-out AUs of data stream 40, but the adherence to predetermined estimated/logged fill level is may also be achieved by the rate control for splice-(back)-in AUs such as $AU_j$ even if not playing a double role as splice-in and splice-out point. Thus, said other encoders may, likewise, control their rate control in such a manner that the estimated or logged fill level assumes a predetermined fill level at a trailing AU of their data stream's AU sequence. Same may be the same as the one mentioned for encoder 70 with respect to splice-out AUs. Such trailing AUs may be supposed to from splice-back AUs supposed to from a splice point with the splice-in AUs of data stream 40 such as $AU_j$. Thus, if the encoder's 70 rate control has planned/scheduled the coded bit rate such that the estimated/logged fill level assumes the predetermined fill level at (or better after) $AU_j$, then this bit rate control remains even valid in case of splicing having been performed after encoding and outputting data stream 40. The predetermined fill level just-mentioned could be known to encoders by default, i.e. agreed therebetween. Alternatively, the respective AU could by provided with an explicit signaling of that estimated/logged fill level as assumed right after the respective splice-in or splice-out AU. For example, the value could be transmitted in the TU packet of the respective splice-in or splice-out AU. This costs additional side information overhead, but the encoder's rate control could be provided with more freedom in developing the estimated/logged fill level at the splice-in or splice-out AU: for example, it may suffice then that the estimated/logged fill level after the respective splice-in or splice-out AU is below some threshold such as ¾ the maximum fill level, i.e. the maximally guaranteed capacity of the decoder's coded audio buffer.

With respect to data stream 40, this means that same is rate controlled to vary around a predetermined mean bitrate, i.e. it has a mean bitrate. The actual bitrate of the splicable audio data stream varies across the sequence of packets, i.e. temporally. The (current) deviation from the predetermined mean bitrate may be integrated temporally. This integrated deviation assumes, at the splice-in and splice-out access units, a value within a predetermined interval which may be less than ½ wide than a range (max-min) of the integrated bitrate deviation, or may assume a fixed value, e.g. a value equal for all splice-in and splice-out AUs, which may be smaller than ¾ of a maximum of the integrated bitrate deviation. As described above, this value may be pre-set by default. Alternatively, the value is not fixed and not equal for all splice-in and splice-out AUs, but may by signaled in the data stream.

Figure 7:
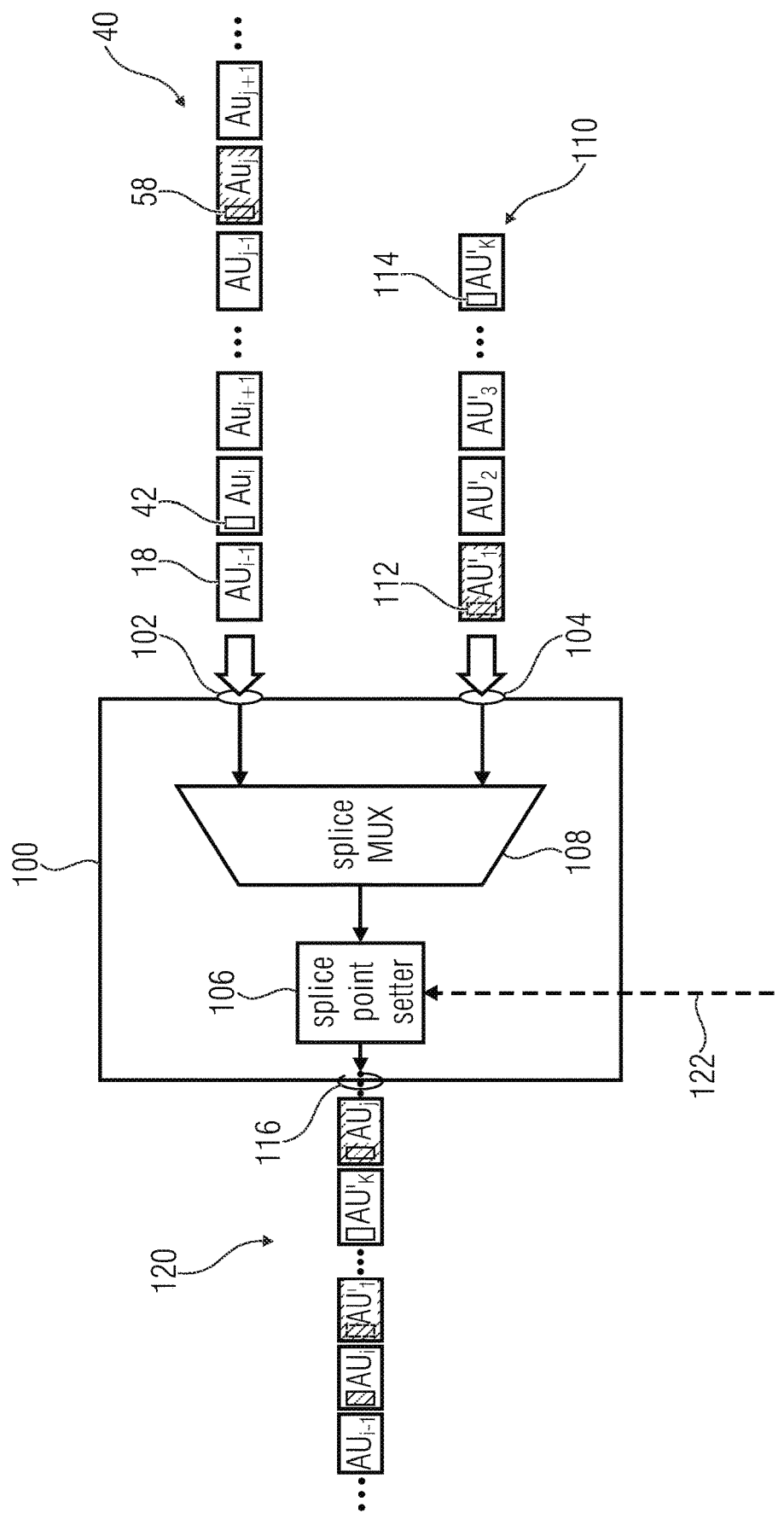
FIG. 7 shows a schematic block diagram of a stream splicer in accordance with an embodiment with the figure additionally showing the stream splicer as receiving the audio data stream of FIG. 2 and outputting a spliced audio data stream based thereon.

FIG. 7 shows a stream splicer for splicing audio data streams in accordance with an embodiment. The stream splicer is indicated using reference 100 and comprises a first audio input interface 102, a second audio input interface 104, a splice point setter 106 and a splice multiplexer 108.

At interface 102, the stream splicer expects to receive a "spliceable" audio data stream, i.e. an audio data stream provided with one or more TU packets. In FIG. 7 it has been exemplarily illustrated that audio data stream 40 of FIG. 2 enters stream splicer 100 at interface 102.

Another audio data stream 110 is expected to be received at interface 104. Depending on the implementation of the stream splicer 100, the audio data stream 110 entering at interface 104 may be a "non-prepared" audio data stream such as the one explained and described with respect to FIG. 1, or a prepared one as it will be illustratively set out below.

The splice point setter 106 is configured to set the truncation unit packet included in the data stream entering at interface 102, i.e. TU packets 42 and 58 of data stream 40 in the case of FIG. 7, and if present the truncation unit packets of the other data stream 110 entering at interface 104, wherein two such TU packets are exemplarily shown in FIG. 7, namely a TU packet 112 in a leading or first access unit $AU'_1$ of audio data stream 110, and a TU packet 114 in a last or trailing access unit $AU'_K$ of audio data stream 110. In particular, the apostrophe is used in FIG. 7 in order to distinguish between access units of audio data stream 110 from access units of audio data stream 40. Further, in the example outlined with respect to FIG. 7, the audio data stream 110 is assumed to be pre-encoded and of fixed-length, namely here of K access units, corresponding to K audio frames which together temporally cover a time interval within which the audio signal having been encoded into data stream 40 is to be replaced. In FIG. 7, it is exemplarily assumed that this time interval to be replaced extends from the audio frame corresponding to access unit $AU_i$ to the audio frame corresponding to access unit $AU_j$.

In particular, the splice point setter 106 is to, in a manner outlined in more detail below, configured to set the truncation unit packets so that it becomes clear that a truncation actually takes place. For example, while the truncation length 48 within the truncation units of the data streams entering interfaces 102 and 104 may be set to zero, splice point setter 106 may change the setting of the transform length 48 of the TU packets to a non-zero value. How the value is determined is the subject of the explanation brought forward below.

The splice multiplexer 108 is configured to cut the audio data stream 40 entering at interface 102 at an access unit with a TU packet such as access unit $AU_i$ with TU packet 42, so as to obtain a subsequence of payload packets of this audio data stream 40, namely here in FIG. 7 exemplarily the subsequence of payload packets corresponding to access units preceding and including access unit $AU_i$, and then splicing this subsequence with a sequence of payload packets of the other audio data stream 110 entering at interface 104 so that same are immediately consecutive with respect to each other and abut each other at the predetermined access unit. For example, splice multiplexer 108 cuts audio data stream 40 at access unit $AU_i$ so as to just include the payload packet belonging to that access unit $AU_i$ with then appending the access units AU' of audio data stream 110 starting with access unit $AU'_1$ so that access units $AU_i$ and $AU'_1$ abut each other. As shown in FIG. 7, splice multiplexer 108 acts similarly in the case of access unit $AU_j$ comprising TU packet 58: this time, splice multiplexer 108 appends data stream 40, starting with payload packets belonging to access unit $AU_j$, to the end of audio data stream 110 so that access unit $AU'_K$ abuts access unit $AU_j$.

Accordingly, the splice point setter 106 sets the TU packet 42 of access unit $AU_i$ so as to indicate that the end portion to be discarded in playout is a trailing end portion since the audio data stream's 40 audio signal is to be replaced, preliminarily, by the audio signal encoded into the audio data stream 110 from that time onwards. In case of truncation unit 58, the situation is different: here, splice point setter 106 sets the TU packet 58 so as to indicate that the end portion to be discarded in playout is a leading end portion of the audio frame with which access unit $AU_j$ is associated. It should be recalled, however, that the fact that TU packet 42 pertains to a trailing end portion while TU packet 58 relates to a leading end portion is already derivable from the inbound audio data stream 40 by way of using, for example, different TU packet identifiers 46 for TU packet 42 on the one hand and TU packet 58 on the other hand.

The stream splicer 100 outputs the spliced audio data stream thus obtained an output interface 116, wherein the spliced audio data stream is indicated using reference sign 120.

It should be noted that the order in which splice multiplexer 108 and splice point setter 106 operate on the access units does not need to be as depicted in FIG. 7. That is, although FIG. 7 suggests that splice multiplexer 108 has its input connected to interfaces 102 and 104, respectively, with the output thereof being connected to output interface 116 via splice point setter 106, the order among splice multiplexer 108 and splice point setter 106 may be switched.

In operation, the stream splicer 100 may be configured to inspect the splice-in syntax element 50 comprised by truncation unit packets 52 and 58 within audio data stream 40 so as to perform the cutting and splicing operation on the condition of whether or not the splice-in syntax element indicates the respective truncation unit packet as relating to a splice-in access unit. This means the following: the splice process illustrated so far and outlined in more detail below may have been triggered by TU packet 42, the splice-in flag 50 is set to one, as described with respect to FIG. 2. Accordingly, the setting of this flag to one is detected by stream splicer 100, whereupon the splice-in operation described in more detail below, but already outlined above, is performed.

As outlined above, splice point setter 106 may not need to change any settings within the truncation unit packets as far as the discrimination between splice-in TU packets such as TU packet 42 and the splice-out TU packets such as TU packets 58 is concerned. However, the splice point setter 106 sets the temporal length of the respective end portion to be discarded in playout. To this end, the splice point setter 106 may be configured to set a temporal length of the end portion to which the TU packets 42, 58, 112 and 114 refer, in accordance with an external clock. This external clock 122 stems, for example, from a video frame clock. For example, imagine the audio signal encoded into audio data stream 40 represents a tone signal accompanying a video and that this video is video 86 of FIG. 6. Imagine further that frame 88 is encountered, i.e. the frame starting a temporal portion 84 into which an ad is to be inserted. Splice point setter 106 may have already detected that the corresponding access unit $AU_i$ comprises the TU packet 42, but the external clock 122 informs splice point setter 106 on the exact time $T_b$ at which the original tone signal of this video shall end and be replaced by the audio signal encoded into data stream 110. For example, this splice-point time instant may be the time instant corresponding to the first picture or frame to be replaced by the ad video which in turn is accompanied by a tone signal encoded into data stream 110.

Figure 8:
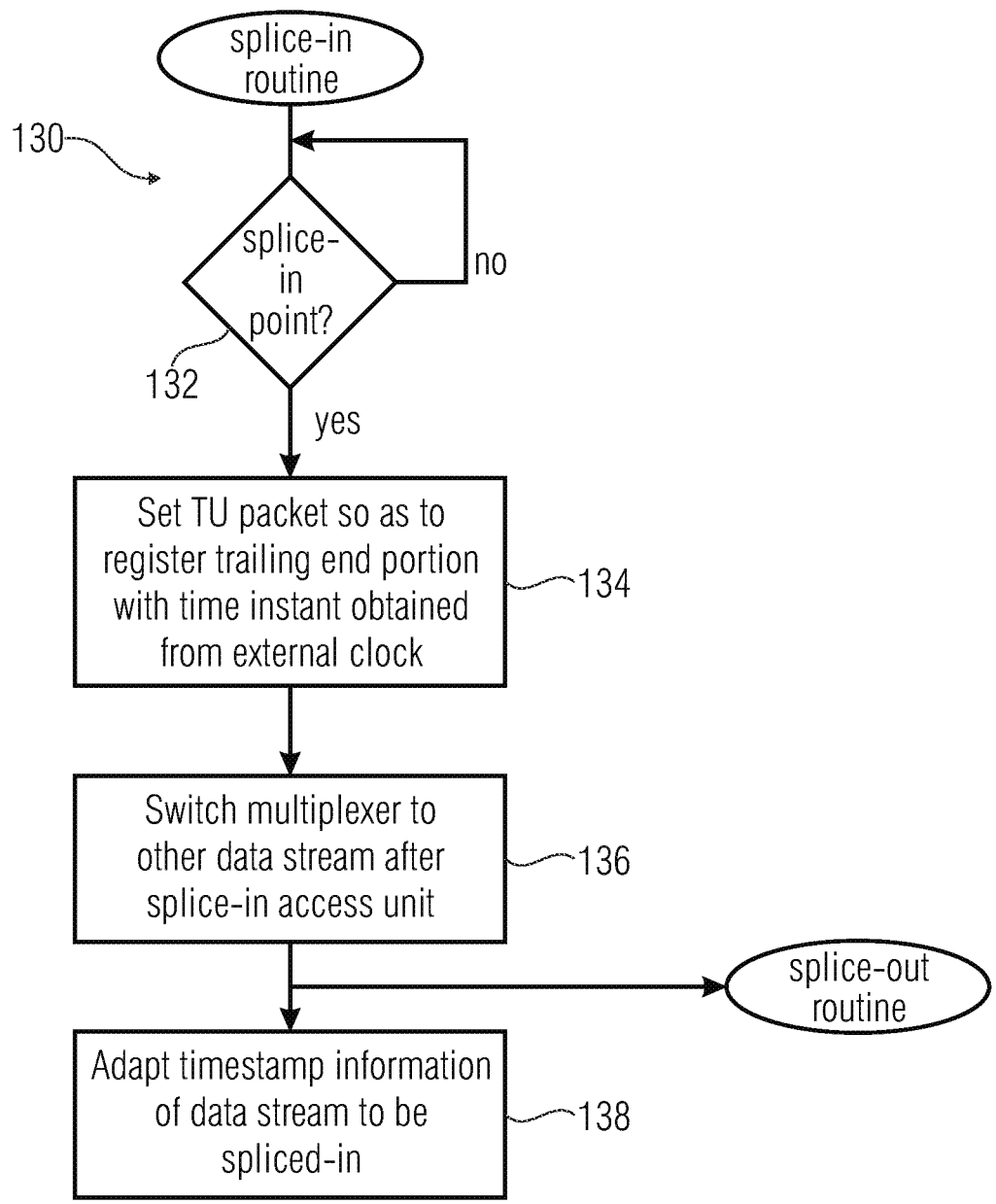
FIG. 8 shows a flow diagram of the mode of operation of the stream splicer of FIG. 7 in splicing the lower audio data stream into the upper one in accordance with an embodiment.

In order to illustrate the mode of operation of the stream splicer 100 of FIG. 7 in more detail, reference is made to FIG. 8, which shows the sequence of steps performed by stream splicer 100. The process starts with a weighting loop 130. That is, stream splicer 100, such as splice multiplexer 108 and/or splice point setter 106, checks audio data stream 40 for a splice-in point, i.e. for an access unit which a truncation unit packet 42 belongs to. In the case of FIG. 7, access unit i is the first access unit passing check 132 with yes, until then check 132 loops back to itself. As soon as the splice-in point access unit $AU_i$ has been detected, the TU packet thereof, i.e. 42, is set so as to register the splice-in point access unit's trailing end portion (its leading end thereof) with the time instant derived from the external clock 122. After this setting 134 by splice point setter 106, the splice multiplexer 108 switches to the other data stream, i.e. audio data stream 110, so that after the current splice-in access unit $AU_i$, the access units of data stream 110 are put to output interface 116, rather than the subsequent access units of audio data stream 40. Assuming that the audio signal which is to replace the audio signal of audio data stream 40 from the splice-in time instant onward, is coded into audio data stream 110 in a manner so that this audio signal is registered with, i.e. starts right away, with the beginning of the first audio frame which is associated with a first access unit $AU'_1$, the stream splicer 100 merely adapts the timestamp information comprised by audio data stream 110 so that a timestamp of the leading frame associated with a first access unit $AU'_1$, for example, coincides with the splice-in time instant, i.e. the time instant of $AU_i$ plus the temporal length of the audio frame associated with $AU_i$ minus the temporal length of the trailing end portion as set in step 134. That is, after multiplexer switching 136, the adaptation 138 is a task continuously performed for the access unit AU' of data stream 110. However, during this time the splice-out routine described next is performed as well.

In particular, the splice-out routine performed by stream splicer 100 starts with a waiting loops according to which the access units of the audio data stream 110 are continuously checked for same being provided with a TU packet 114 or for being the last access unit of audio data stream 110. This check 142 is continuously performed for the sequence of access units AU'. As soon as the splice-out access unit has been encountered, namely AU'$_K$ in the case of FIG. 7, then splice point setter 106 sets the TU packet 114 of this splice-out access unit so as to register the trailing end portion to be discarded in playout, the audio frame corresponding to this access unit AUK with a time instant obtained from the external clock such as a timestamp of a video frame, namely the first after the ad which the tone signal coded into audio data stream 110 belongs to. After this setting 144, the splice multiplexer 108 switches from its input at which data stream 110 is inbound, to its other input. In particular, the switching 146 is performed in a manner so that in the spliced audio data stream 120, access unit AU$_j$ immediately follows access unit AU'$_K$. In particular, the access unit AU$_j$ is the access unit of data stream 40, the audio frame of which is temporally distanced from the audio frame associated with the splice-in access unit AU$_i$ by a temporal amount which corresponds to the temporal length of the audio signal encoded into data stream 110 or deviates therefrom by less than a predetermined amount such as a length or half a length of the audio frames of the access units of audio data stream 40.

Thereinafter, splice point setter 106 sets in step 148 the TU packet 58 of access unit AU$_j$ to register the leading end portion thereof to be discarded in playout, with the time instant with which the trailing end portion of the audio frame of access unit AU'$_K$ had been registered in step 144. By this measure, the timestamp of the audio frame of access unit AU$_j$ equals the timestamp of the audio frame of access unit AU'$_K$ plus a temporal length of the audio frame of access unit AU'$_K$ minus the sum of the trailing end portion of audio frame of access unit AU'$_K$ and the leading end portion of the audio frame of access unit AU$_j$. This fact will become clearer looking at the examples provided further below.

This splice-in routine is also started after the switching 146. Similar to ping-pong, the stream splicer 100 switches between the continuous audio data stream 40 on the one hand and audio data streams of predetermined length so as to replace predetermined portions, namely those between access units with TU packets on the one hand and TU packets 58 on the other hand, and back again to audio stream 40.

Switching from interface 102 to 104 is performed by the splice-in routine, while the splice-out routine leads from interface 104 to 102.

It is emphasized, however, again that the example provided with respect to FIG. 7 has merely been chosen for illustration purposes. That is, the stream splicer 100 of FIG. 7 is not restricted to "bridge" portions to be replaced from one audio data stream 40 by audio data streams 110 having encoded thereinto audio signals of appropriate length with the first access unit having the first audio frame encoded thereinto registered to the beginning of the audio signal to be inserted into the temporal portion to be replaced. Rather, the stream splicer may be, for instance, for performing a one-time splice process only. Moreover, audio data stream 110 is not restricted to have its first audio frame registered with the beginning of the audio signal to be spliced-in. Rather, the audio data stream 110 itself may stem from some source having its own audio frame clock which runs independently from the audio frame clock underlying audio data stream 40. In that case, switching from audio data stream 40 to audio data stream 110 would, in addition to the steps shown in FIG. 8, also comprise the setting step corresponding to step 148: the setting of the TU packet of the audio data stream 110.

It should be noted that the above description of the stream splicer's operation may be varied with respect to the timestamp of AUs of the spliced audio data stream 120 for which a TU packet indicates a leading end portion to be discarded in playout. Instead of leaving the AU's original timestamp, the stream multiplexer 108 could be configured to modify the original timestamp thereof by adding the leading end portion's temporal length to the original timestamp thereby pointing to the trailing end of the leading end portion and thus, to the time from which on the AU's audio frame fragment is be actually played out. This alternative is illustrated by the timestamp examples in FIG. 16 discussed later.

Figure 9:
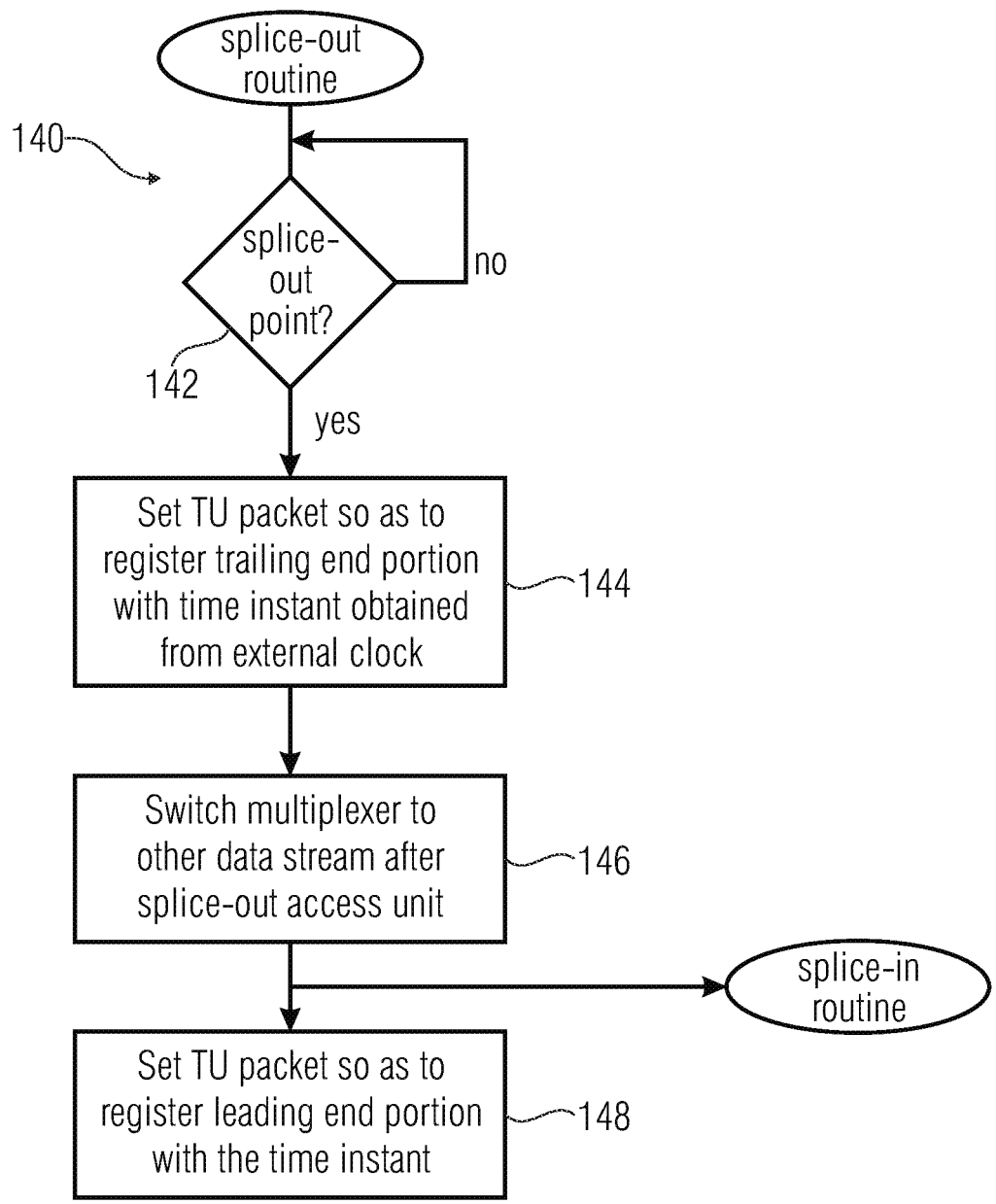
FIG. 9 shows a flow diagram of the mode of operation of the stream splicer in splicing from the lower audio data stream back to the upper one in accordance with an embodiment.
Figure 10:
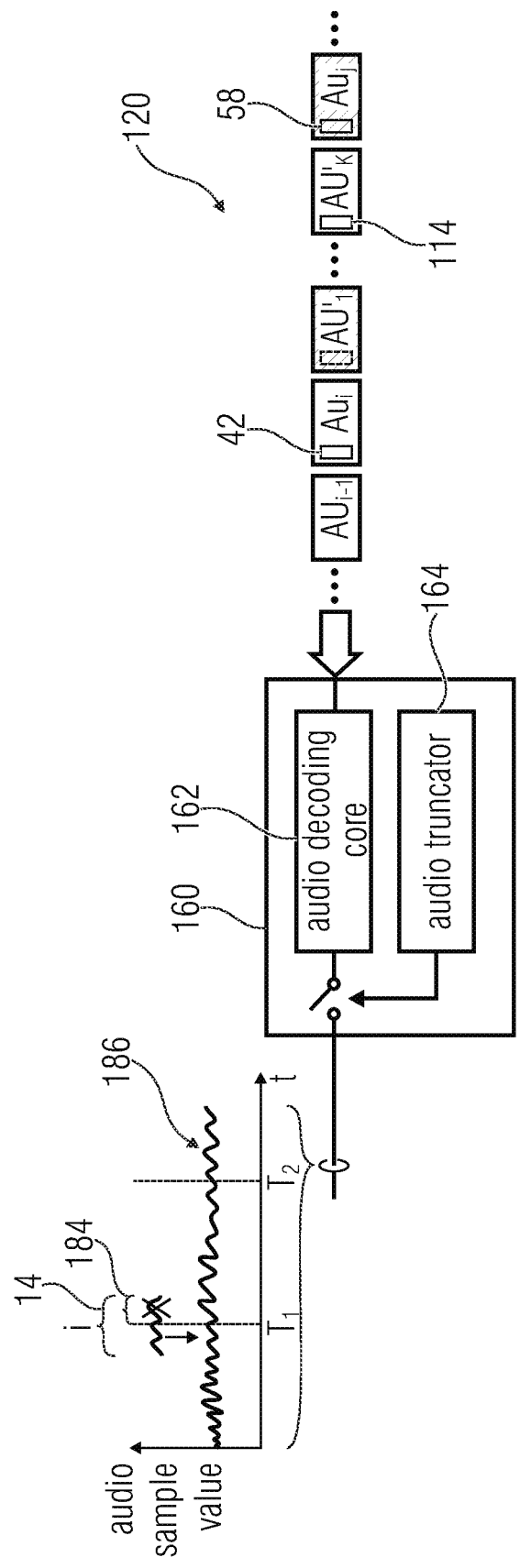
FIG. 10 shows a block diagram of an audio decoder according to an embodiment with additionally illustrating the audio decoder as receiving the spliced audio data stream shown in FIG. 7.

FIG. 10 shows an audio decoder 160 in accordance with an embodiment of the present application. Exemplarily, the audio decoder 160 is shown as receiving the spliced audio data stream 120 generated by stream splicer 100. However, similar to the statement made with respect to the stream splicer, the audio decoder 160 of FIG. 10 is not restricted to receive spliced audio data streams 120 of the sort explained with respect to FIGS. 7 to 9, where one base audio data stream is preliminarily replaced by other audio data streams having the corresponding audio signal length encoded thereinto.

The audio decoder 160 comprises an audio decoder core 162 which receives the spliced audio data stream and an audio truncator 164. The audio decoding core 162 performs the reconstruction of the audio signal in units of audio frames of the audio signal from the sequence of payload packets of the inbound audio data stream 120, wherein, as explained above, the payload packets are individually associated with a respective one of the sequence of access units into which the spliced audio data stream 120 is partitioned. As each access unit 120 is associated with a respective one of the audio frames, the audio decoding core 162 outputs the reconstructed audio samples per audio frame and associated access unit, respectively. As described above, the decoding may involve an inverse spectral transformation and owing to an overlap/add process or, optionally, predictive coding concepts, the audio decoding core 162 may reconstruct the audio frame from a respective access unit while additionally using, i.e. depending on, a predecessor access unit. However, whenever an immediate playout access unit arrives, such as access unit AU$_j$, the audio decoding core 162 is able to use additional data in order to allow for an immediate playout without needing or expecting any data from a previous access unit. Further, as explained above, the audio decoding core 162 may operate using linear predictive decoding. That is, the audio decoding core 162 may use linear prediction coefficients contained in the respective access unit in order to form a synthesis filter and may decode an excitation signal from the access unit involving, for instance, transform decoding, i.e. inverse transforming, table lookups using indices contained in the respective access unit and/or predictive coding or internal state updates with then subjecting the excitation signal thus obtained to the synthesis filter or, alternatively, shaping the excitation signal in the spectral domain using a transfer function formed so as to correspond to the transfer function of the synthesis filter. The audio truncator 164 is responsive to the truncation unit packets inserted into the audio data stream 120 and truncates an audio frame associated with a certain access unit having such TU packets so as to discard the end portion thereof, which is indicated to be discarded in playout of the TU packet.

Figure 11:
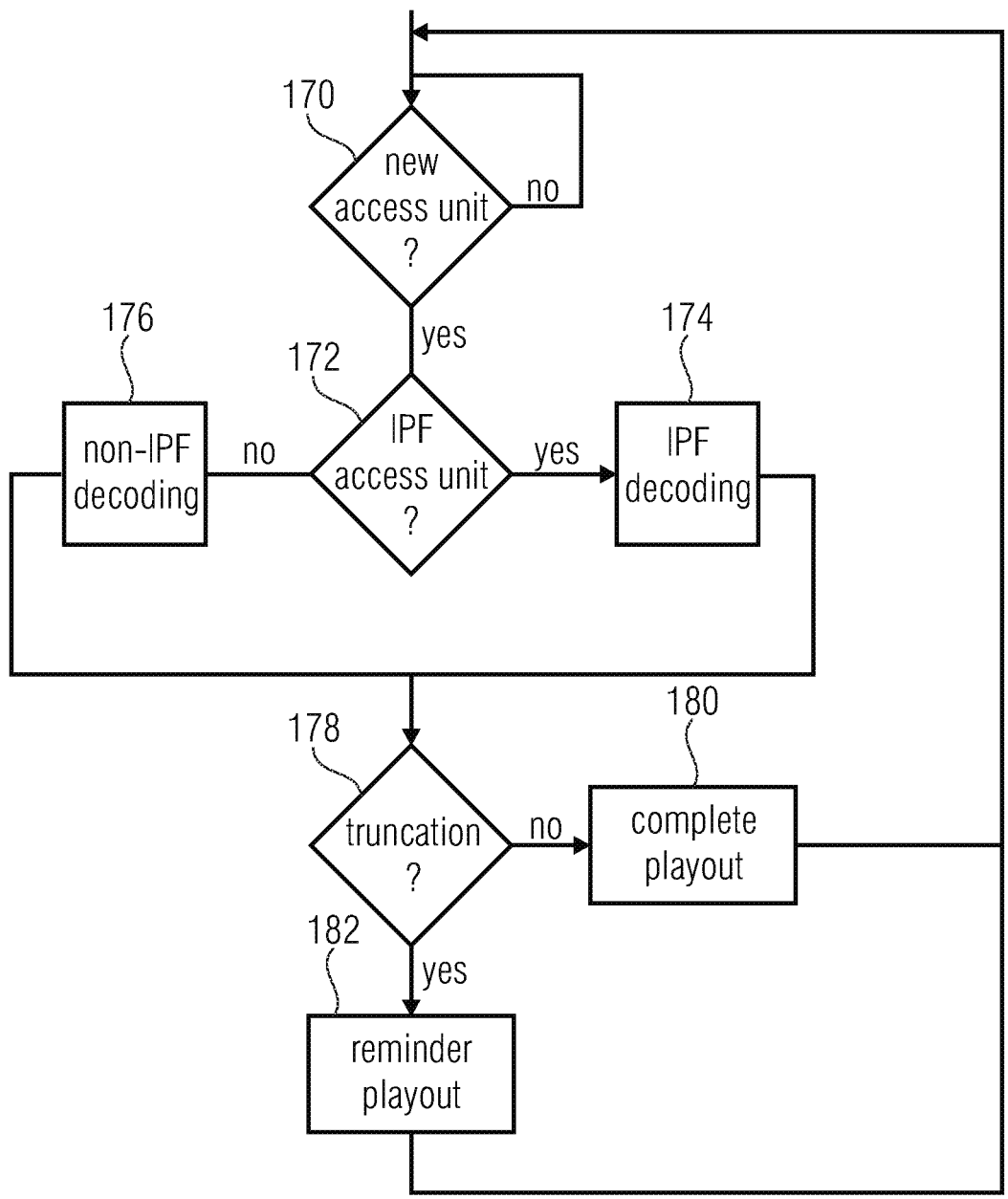
FIG. 11 shows a flow diagram of a mode of operation of the audio decoder of FIG. 10 in order to illustrate the different handlings of access units depending on the same being IPF access units and/or access units comprising TU packets.

FIG. 11 shows a mode of operation of the audio decoder 160 of FIG. 10. Upon detecting 170 a new access unit, the audio decoder checks whether or not this access unit is one coded using immediate playout mode. If the current access unit is an immediate playout frame access unit, the audio decoding core 162 treats this access unit as a self-contained source of information for reconstructing the audio frame associated with this current access unit. That is, as explained above the audio decoding core 162 may pre-fill internal registers for reconstructing the audio frame associated with a current access unit on the basis of the data coded into this access unit. Additionally or alternatively, the audio decoding core 162 refrains from using prediction from any predecessor access unit as in the non-IPF mode. Additionally or alternatively, the audio decoding core 162 does not perform any overlap-add process with any predecessor access unit or its associated predecessor audio frame for the sake of aliasing cancelation at the temporally leading end of the audio frame of the current access unit. Rather, for example, the audio decoding core 162 derives temporal aliasing cancelation information from the current access unit itself. Thus, if the check 172 reveals that the current access unit is an IPF access unit, then the IPF decoding mode 174 is performed by the audio decoding core 162, thereby obtaining the reconstruction of the current audio frame. Alternatively, if check 172 reveals that the current access unit is not an IPF one, then the audio decoding core 162 applies as usual non-IPF decoding mode onto the current access unit. That is, internal registers of the audio decoding core 162 may be adopted as they are after processing the previous access unit. Alternatively or additionally, an overlap-add process may be used so as to assist in reconstructing the temporally trailing end of the audio frame of the current access unit. Alternatively or additionally, prediction from the predecessor access unit may be used. The non-IPF decoding 176 also ends-up in a reconstruction of the audio frame of the current access unit. A next check 178 checks whether any truncation is to be performed. Check 178 is performed by audio truncator 164. In particular, audio truncator 164 checks whether the current access unit has a TU packet and whether the TU packet indicates an end portion to be discarded in playout. For example, the audio truncator 164 checks whether a TU packet is contained in the data stream for the current access unit and whether the splice active flag 52 is set and/or whether truncation length 48 is unequal to zero. If no truncation takes place, the reconstructed audio frame as reconstructed from any of steps 174 or 176 is played out completely in step 180. However, if truncation is to be performed, audio truncator 164 performs the truncation and merely the remaining part is played out in step 182. In the case of the end portion indicated by the TU packet being a trailing end portion, the remainder of the reconstructed audio frame is played out starting with the timestamp associated with that audio frame. In case of the end portion indicated to be discarded in playout by the TU packet being a leading end portion, the remainder of the audio frame is played-out at the timestamp of this audio frame plus the temporal length of the leading end portion. That is, the playout of the remainder of the current audio frame is deferred by the temporal length of the leading end portion. The process is then further prosecuted with the next access unit.

See the example in FIG. 10: the audio decoding core 162 performs normal non-IPF decoding 176 onto access units $AU_{i-1}$ and $AU_i$. However, the latter has TU packet 42. This TU packet 42 indicates a trailing end portion to be discarded in playout, and accordingly the audio truncator 164 prevents a trailing end 184 of the audio frame 14 associated with access unit $AU_i$ from being played out, i.e. from participating in forming the output audio signal 186. Thereinafter, access unit $AU'_1$ arrives. Same is an immediate playout frame access unit and is treated by audio decoding core 162 in step 174 accordingly. It should be noted that audio decoding core 162 may, for instance, comprise the ability to open more than one instantiation of itself. That is, whenever an IPF decoding is performed, this involves the opening of a further instantiation of the audio decoding core 162. In any case, as access unit $AU'_1$ is an IPF access unit, it does not matter that its audio signal is actually related to a completely new audio scene compared to its predecessors $AU_{i-1}$ and $AU_i$. The audio decoding core 162 does not care about that. Rather, it takes access unit $AU'_1$ as a self-contained access unit and reconstructs the audio frame therefrom. As the length of the trailing end portion of the audio frame of the predecessor access unit $AU_i$ has probably been set by the stream splicer 100, the beginning of the audio frame of access unit $AU'_1$ immediately abuts the trailing end of the remainder of the audio frame of access unit $AU_i$. That is, they abut at the transition time $T_1$ somewhere in the middle of the audio frame of access unit $AU_i$. Upon encountering access unit $AU'_K$, the audio decoding core 162 decodes this access unit in step 176 in order to reveal or reconstruct this audio frame, whereupon this audio frame is truncated at its trailing end owing to the indication of the trailing end portion by its TU packet 114. Thus, merely the remainder of the audio frame of access unit $AU'_K$ up to the trailing end portion is played-out. Then, access unit $AU_j$ is decoded by audio decoding core 162 in the IPF decoding 174, i.e. independently from access unit $AU'_K$ in a self-contained manner and the audio frame obtained therefrom is truncated at its leading end as its truncation unit packet 58 indicates a leading end portion. The remainders of the audio frames of access units $AU'_K$ and $AU_j$ abut each other at a transition time instant $T_2$.

The embodiments described above basically use a signaling that describes if and how many audio samples of a certain audio frame should be discarded after decoding the associated access unit. The embodiments described above may for instance be applied to extend an audio codec such as MPEG-H 3D Audio. The MEPG-H 3D Audio standard defines a self-contained stream format to transform MPEG-H 3D audio data called MHAS [2]. In line with the embodiments described above, the truncation data of the truncation unit packets described above could be signaled at the MHAS level. There, it can be easily detected and can be easily modified on the fly by stream splicing devices such as the stream splicer 100 of FIG. 7. Such a new MHAS packet type could be tagged with PACTYP_CUTRUNCATION, for example. The payload of this packet type could have the syntax shown in FIG. 12. In order to ease the concordance between the specific syntax example of FIG. 12 and the description brought forward above with respect to FIGS. 3 and 4, for example, the reference signs of FIGS. 3 and 4 have been reused in order to identify corresponding syntax elements in FIG. 12. The semantics could be as follows:

isActive: If 1 the truncation message is active, if 0 the decoder should ignore the message.

canSplice: tells a splicing device that a splice can start or continue here. (Note: This is basically an ad-begin flag, but the splicing device can reset it to 0 since it does not carry any information for the decoder.)

truncRight: if 0 truncate samples from the end of the AU, if 1 truncate samples from the beginning of the AU.

nTruncSamples: number of samples to truncate.

Note that the MHAS stream guarantees that a MHAS packet payload is byte-aligned so the truncation information is easily accessible on the fly and can be easily inserted, removed or modified by e.g. a stream splicing device. A MPEG-H 3D Audio stream could contain a MHAS packet type with pactype PACTYP_CUTRUNCATION for every AU or for a suitable subset of AUs with isActive set to 0. Then a stream splicing device can modify this MHAS packet according to its need. Otherwise a stream splicing device can easily insert such a MHAS packet without adding significant bitrate overhead as it is described hereinafter. The largest granule size of MPEG-H 3D Audio is 4096 samples, so 13 bits for nTruncSamples are sufficient to signal all meaningful truncation values. nTruncSamples and the 3 one bit flags together occupy 16 bits or 2 bytes so that no further byte alignment is needed.

Figure 13A:
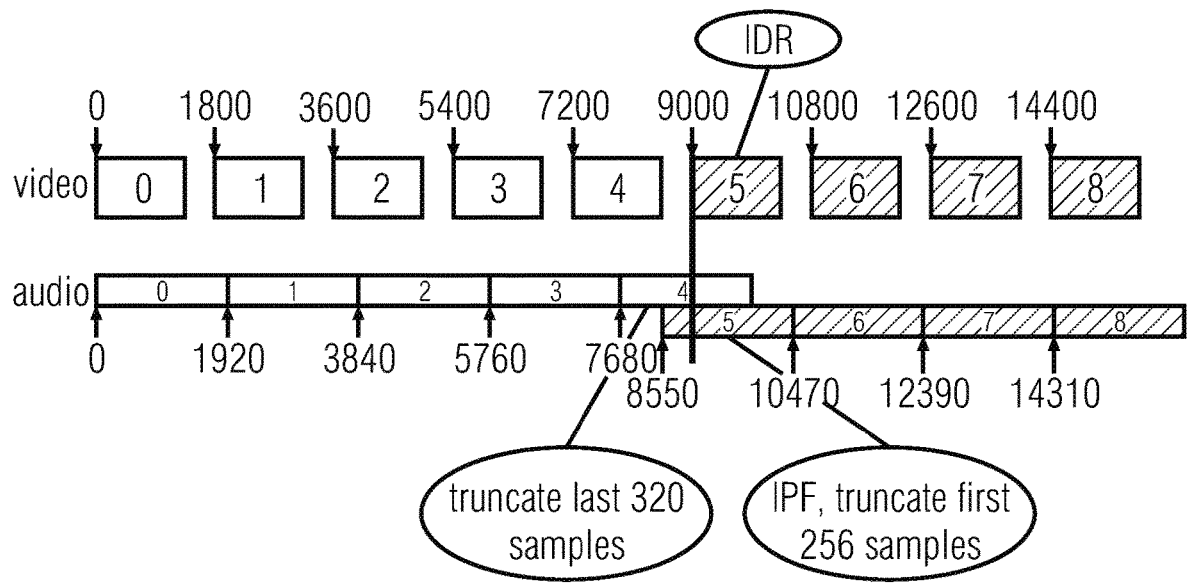
FIGS. 13A-C show different examples of how to splice from one audio data stream to the other, with the splicing time instant being determined by a video, here a video at 50 frames per second and an audio signal coded into the audio data streams at 48 kHz with 1024 sample-wide granules or audio frames and with a timestamp timebase of 90 kHz so that one video frame duration equals 1800 timebase ticks while one audio frame or audio granule equals 1920 timebase ticks.
Figure 13B:
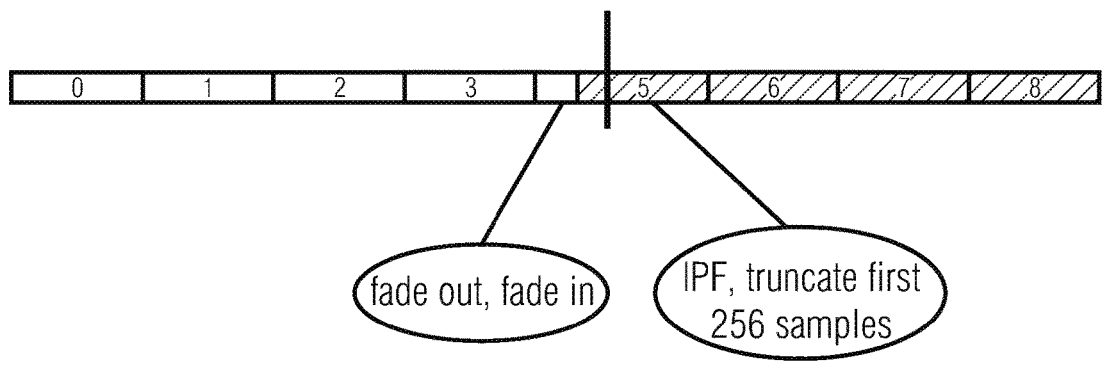
Figure 13C:
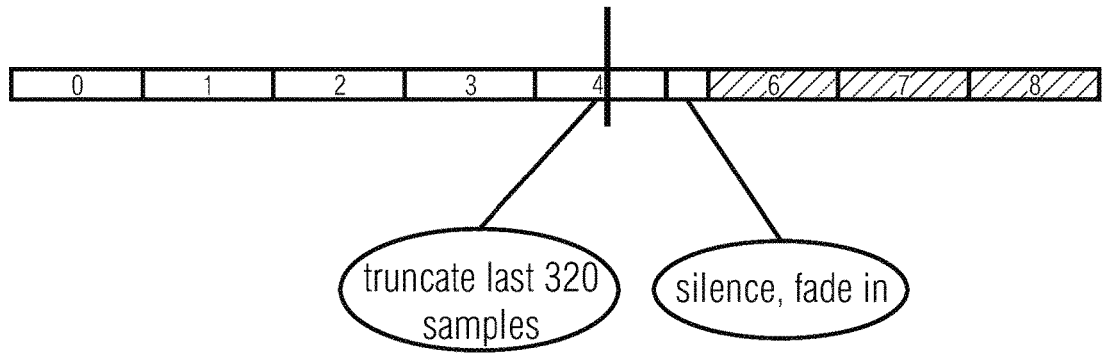

FIGS. 13a-c illustrate how the method of CU truncation can be used to implement sample accurate stream splicing.

FIG. 13a shows a video stream and an audio stream. At video frame number 5 the program is switched to a different source. The alignment of video and audio in the new source is different than in the old source. To enable sample accurate switching of the decoded audio PCM samples at the end of the last CU of the old stream and at the beginning of the new stream have to be removed. A short period of cross-fading in the decoded PCM domain may be used to avoid glitches in the output PCM signal. FIG. 13a shows an example with concrete values. If for some reason the overlap of AUs/CUs is not desired, the two possible solutions depicted in FIG. 13B) and FIG. 13C) exist. The first AU of the new stream has to carry the configuration data for the new stream and all pre-roll that is needed to initialize the decoder with the new configuration. This can be done by means of an Immediate Playout Frame (IPF) that is defined in the MPEG-H 3D Audio standard.

Another application of the CU truncation method is changing the configuration of a MPEG-H 3D Audio stream. Different MPEG-H 3D Audio streams may have very different configurations. E.g. a stereo program may be followed by a program with 11.1 channels and additional audio objects. The configuration will usually change at a video frame boundary that is not aligned with the granules of the audio stream. The method of CU truncation can be used to implement sample accurate audio configuration change as illustrated in FIG. 14.

Figure 14:
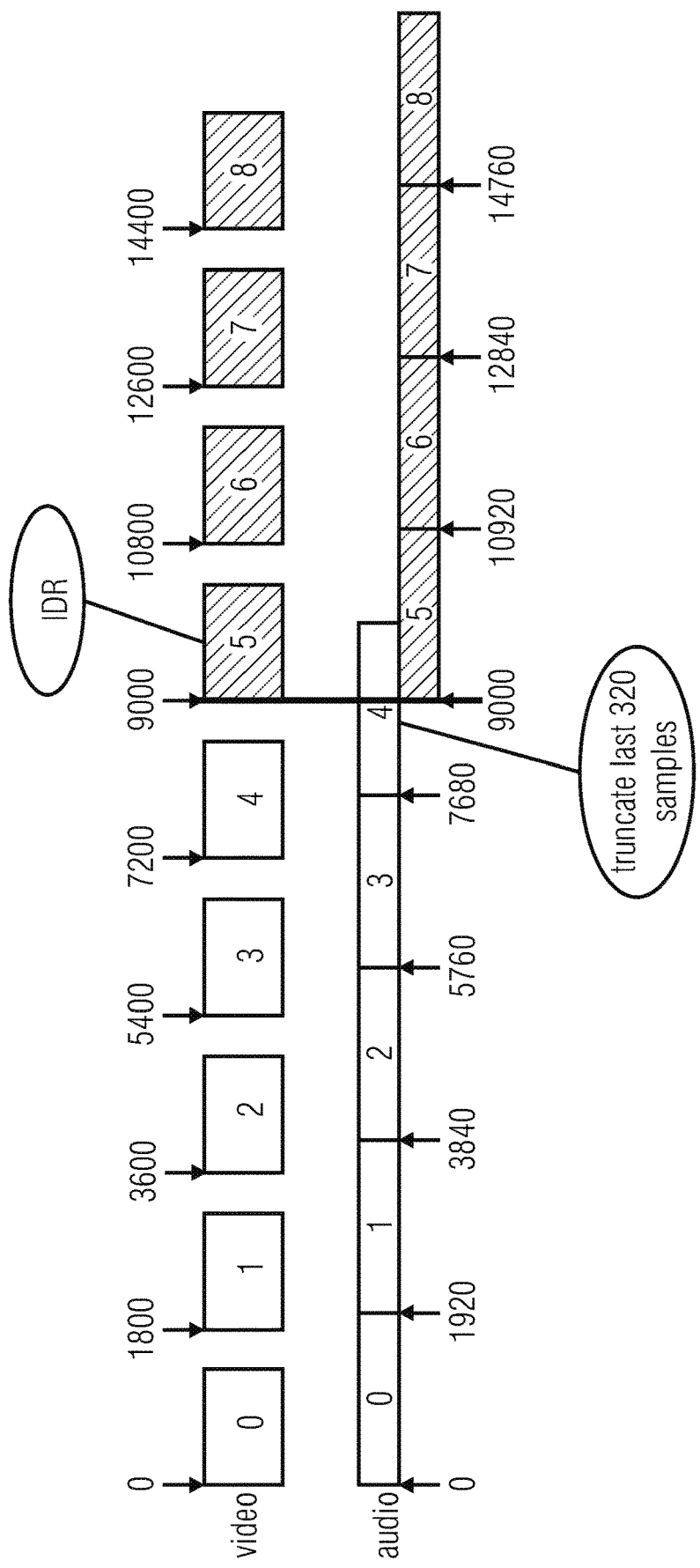
FIG. 14 shows a schematic diagram illustrating another exemplary case of splicing two audio data streams at a splicing time instant determined by an audio frame raster using the exemplary frame and sample rates of FIGS. 13A-C.
Figure 15A:
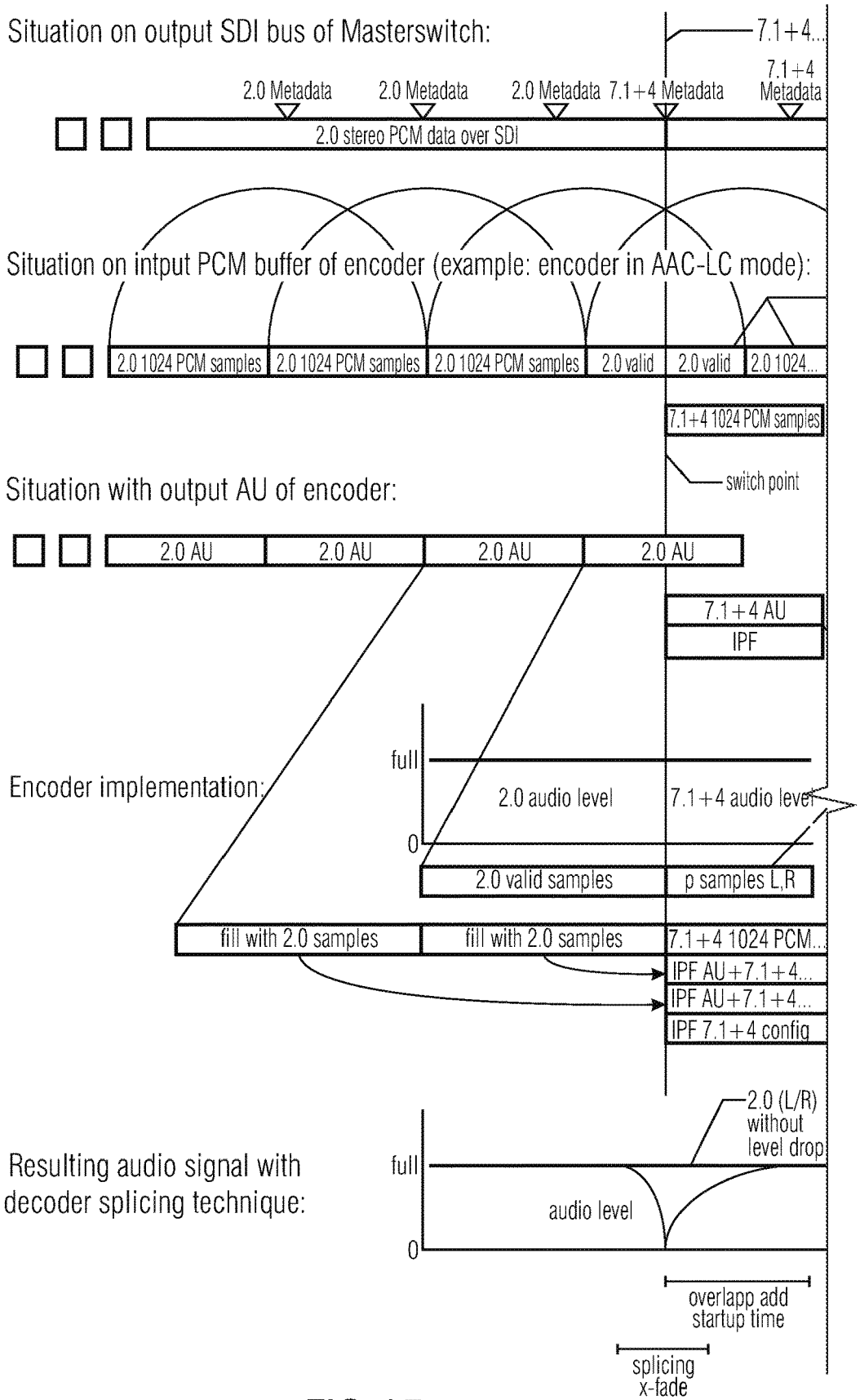
FIG. 15a-b shows a schematic diagram illustrating an encoder action in splicing two audio data streams of different coding configurations in accordance with an embodiment.
Figure 15B:
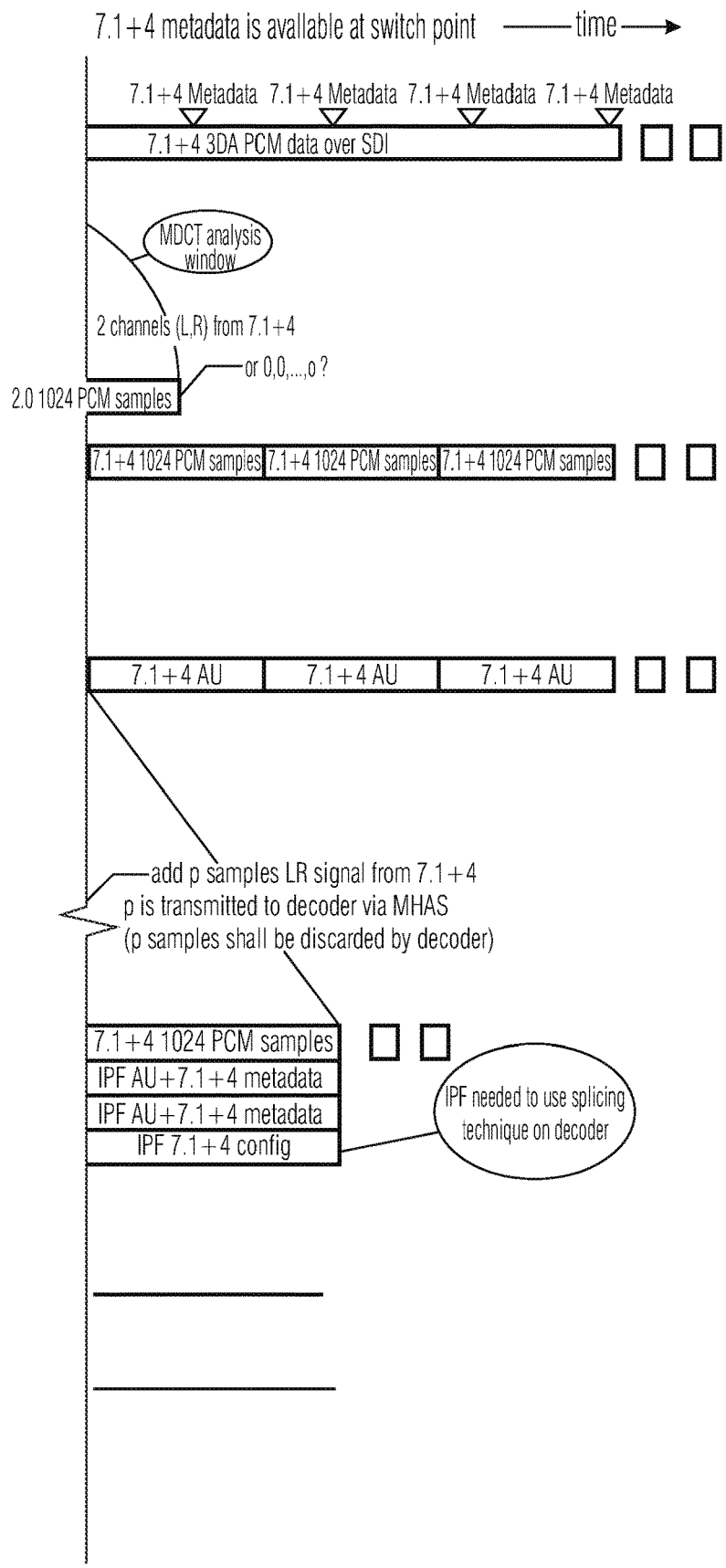

FIG. 14 shows a video stream and an audio stream. At video frame number 5 the program is switched to a different configuration. The first CU with the new audio configuration is aligned with the video frame at which the configuration change occurred. To enable sample accurate configuration change audio PCM samples at the end of the last CU with the old configuration have to be removed. The first AU with the new configuration has to carry the new configuration data and all pre-roll that is needed to initialize the decoder with the new configuration. This can be done by means of an Immediate Playout Frame (IPF) that is defined in the MPEG-H 3D Audio standard. An encoder may use PCM audio samples from the old configuration to encode pre-roll for the new configuration for channels that are present in both configurations. Example: If the configuration change is from stereo to 11.1, then the left and right channels of the new 11.1 configuration can use pre-roll data form left and right from the old stereo configuration. The other channels of the new 11.1 configuration use zeros for pre-roll. FIG. 15 illustrates encoder operation and bitstream generation for this example.

Figure 16B:
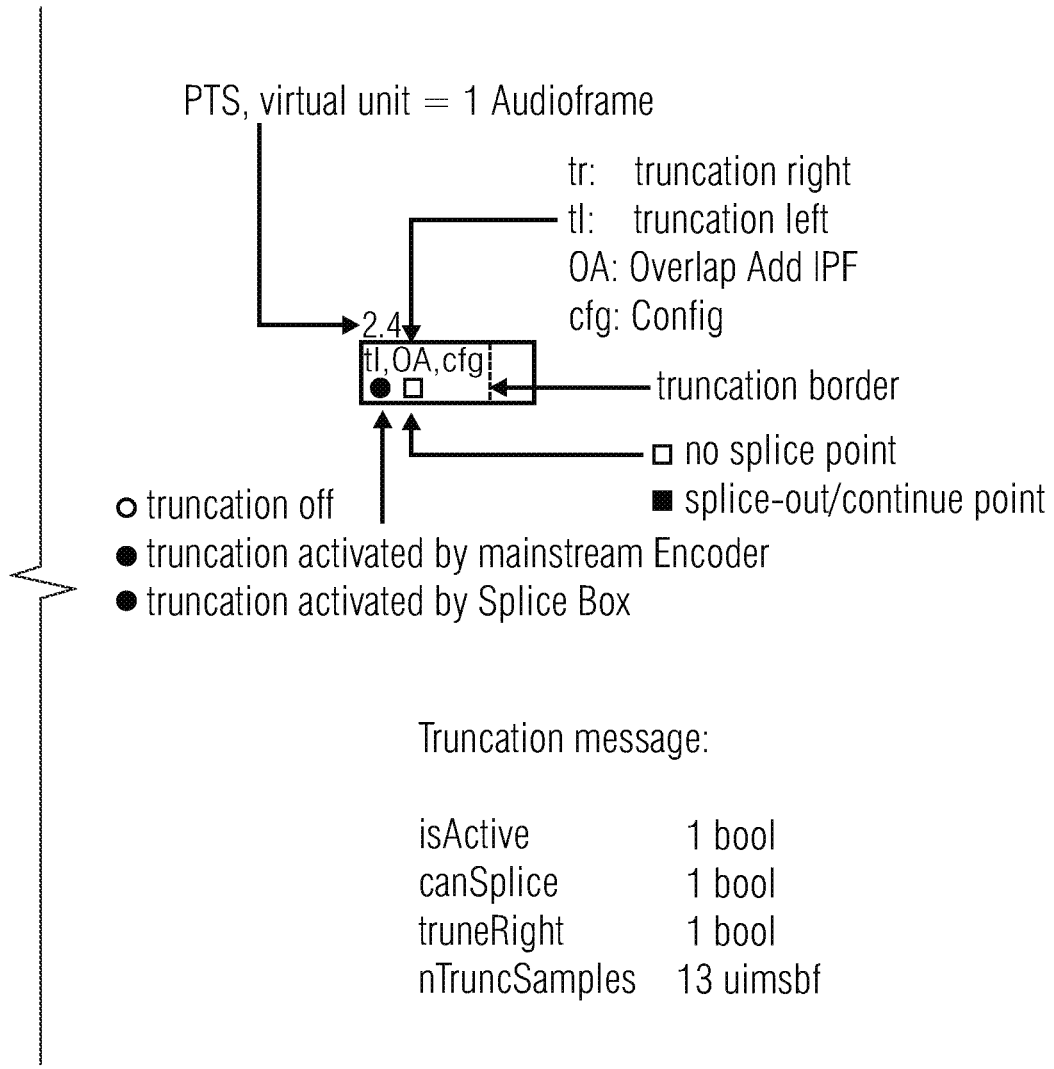

FIG. 16 shows further examples for spliceable or spliced audio data streams. See FIG. 16A, for example. FIG. 16A shows a portion out of a spliceable audio data stream exemplarily comprising seven consecutive access units $AU_1$ to $AU_7$. The second and sixth access units are provided with a TU packet, respectively. Both are not used, i.e. non-active, by setting flag 52 to zero. The TU packet of access unit $AU_6$ is comprised by an access unit of the IPF type, i.e. it enables a splice back into the data stream. At B, FIG. 16 shows the audio data stream of A after insertion of an ad. The ad is coded into a data stream of access units $AU'_1$ to $AU'_4$. At C and D, FIG. 16 shows a modified case compared to A and B. In particular, here the audio encoder of the audio data stream of access units $AU_1, \ldots,$ has decided to change the coding settings somewhere within the audio frame of access unit $AU_6$. Accordingly, the original audio data stream of C already comprises two access units of timestamp 6.0, namely $AU_6$ and $AU'_1$ with respective trailing end portion and leading end portion indicated as to be discarded in playout, respectively. Here, the truncation activation is already preset by the audio decoder. Nevertheless, the $AU'_1$ access unit is still usable as a splice-back-in access unit, and this possibility is illustrated in D.

An example of changing the coding settings at the splice-out point is illustrated in E and F. Finally, at G and H the example of A and B in FIG. 16 is extended by way of another TU packet provided access unit $AU_5$, which may serve as a splice-in or continue point.

As has been mentioned above, although the pre-provision of the access units of an audio data stream with TU packets may be favorable in terms of the ability to take the bitrate consumption of these TU packets into account at a very early stage in access unit generation, this is not mandatory. For example, the stream splicer explained above with respect to FIGS. 7 to 9 may be modified in that the stream splicer identifies splice-in or splice-out points by other means than the occurrence of a TU packet in the inbound audio data stream at the first interface 102. For example, the stream splicer could react to the external clock 122 also with respect to the detection of splice-in and splice-out points. According to this alternative, the splice point setter 106 would not only set the TU packet but also insert them into the data stream. However, please note that the audio encoder is not freed from any preparation task: the audio encoder would still have to choose the IPF coding mode for access units which shall serve as splice-back-in points.

Figure 17:
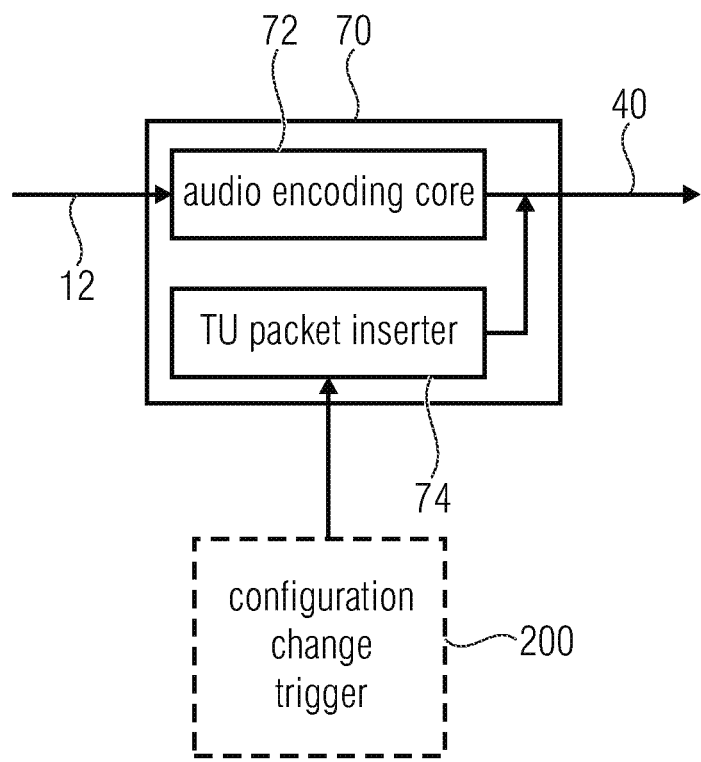
FIG. 17 shows a block diagram of an audio encoder supporting different coding configurations in accordance with an embodiment.

Finally, FIG. 17 shows that the favorable splice technique may also be used within an audio encoder which is able to change between different coding configurations. The audio encoder 70 in FIG. 17 is constructed in the same manner as the one of FIG. 5, but this time the audio encoder 70 is responsive to a configuration change trigger 200. That is, see for example case C in FIG. 16: the audio encoding core 72 continuously encodes the audio signal 12 into access units $AU_1$ to $AU_6$. Somewhere within the audio frame of access unit $AU_6$, the configuration change time instant is indicated by trigger 200. Accordingly, audio encoding core 72, using the same audio frame raster, also encodes the current audio frame of access unit $AU_6$ using a new configuration such as an audio coding mode involving more coded audio channels or the like. The audio encoding core 72 encodes the audio frame the other time using the new configuration with additionally using the IPF coding mode. This ends up into access unit $AU'_1$, which immediately follows an access unit order. Both access units, i.e. access unit $AU_6$ and access unit $AU'_1$ are provided with TU packets by TU packet inserter 74, the former one having a trailing end portion indicated so as to be discarded in playout and the latter one having a leading end portion indicated as to be discarded in playout. The latter one may, as it is an IPF access unit, also serve as a splice-back-in point.

For all of the above-described embodiments it should be noted that, possibly, cross-fading is performed at the decoder between the audio signal reconstructed from the subsequence of AUs of the spliced audio data stream up to a splice-out AU (such as $AU_i$), which is actually supposed to terminate at the leading end of the trailing end portion of the audio frame of this splice-out AU on the one hand and the audio signal reconstructed from the subsequence of AUs of the spliced audio data stream from the AU immediately succeeding the splice-out AU (such as $AU'_1$) which may be supposed to start right away from the leading end of audio frame of the successor AU, or at the trailing end of the leading end portion of the audio frame of this successor AU: That is, within a temporal interval surrounding and crossing the timestant where the portions of the immediately consecutive AUs, to be played-out abut each other, the actually played-out audio signal as played out from the spliced audio data stream by the decoder could be formed by a combination of the audio frames of both immediately abutting AUs with a combinational contribution of the audio frame of the successor AU temporally increasing within this temporal interval and the combinational contribution of the audio frame of the splice-out AU temporally decreasing in the temporal interval. Similarly, cross fading could be performed between splice-in AUs such as $AU_j$ and their immediate predecessor AUs (such as $AU'_K$), namely by forming the actually played out audio signal by a combination of the audio frame of the splice-in AU and the audio frame of the predecessor AU within a time interval surrounding and crossing the time instant at which the leading end portion of the splice-in AU's audio frame and the trailing end portion of the predecessor AU's audio frame abut each other.

Using another wording, above embodiments, inter alias revealed, a possibility to exploit bandwidth available by the transport stream, and available decoder MHz: a kind of Audio Splice Point Message is sent along with the audio frame it would replace. Both the outgoing audio and the incoming audio around the splice point are decoded and a crossfade between them may be performed. The Audio Splice Point Message merely tells the decoders where to do the crossfade. This is in essence a "perfect" splice because the splice occurs correctly registered in the PCM domain.

Thus, above description revealed, inter alias, the following aspects:

A1. Spliceable audio data stream 40, comprising:
- a sequence of payload packets 16, each of the payload packets belonging to a respective one of a sequence of access units 18 into which the spliceable audio data stream is partitioned, each access unit being associated with a respective one of audio frames 14 of an audio signal 12 which is encoded into the spliceable audio data stream in units of the audio frames; and
- a truncation unit packet 42; 58 inserted into the spliceable audio data stream and being settable so as to indicate, for a predetermined access unit, an end portion 44; 56 of an audio frame with which the predetermined access unit is associated, as to be discarded in playout.

A2. Spliceable audio data stream according to aspect A1, wherein the end portion of the audio frame is a trailing end portion 44.

A3. Spliceable audio data stream according to aspect A1 or A2, wherein the spliceable audio data stream further comprises:
- a further truncation unit packet 58 inserted into the spliceable audio data stream and being settable so as to indicate for a further predetermined access unit, an end portion 44; 56 of a further audio frame with which the further predetermined access unit is associated, as to be discarded in playout.

A4. Spliceable audio data stream according to aspect A3, wherein the end portion of the further audio frame is a leading end portion 56.

A5. Spliceable audio data stream according to aspect A3 or A4, wherein the truncation unit packet 42 and the further truncation unit packet 58 comprise a splice-out syntax element 50, respectively, which indicates whether the respective one of the truncation unit packet or the further truncation unit packet relates to a splice-out access unit or not.

A6. Spliceable audio data stream according to any of aspects A3 to A5, wherein the predetermined access unit such as $AU_i$ has encoded thereinto the respective associated audio frame in a manner so that a reconstruction thereof at decoding side is dependent on an access unit immediately preceding the predetermined access unit, and a majority of the access units has encoded thereinto the respective associated audio frame in a manner so that the reconstruction thereof at decoding side is dependent on the respective immediately preceding access unit, and the further predetermined access unit $AU_j$ has encoded thereinto the respective associated audio frame in a manner so that the reconstruction thereof at decoding side is independent from the access unit immediately preceding the further predetermined access unit, thereby allowing immediate playout.

A7. Spliceable audio data stream according to aspect A6, wherein the truncation unit packet 42 and the further truncation unit packet 58 comprise a splice-out syntax element 50, respectively, which indicates whether the respective one of the truncation unit packet or the further truncation unit packet relates to a splice-out access unit or not, wherein the splice-out syntax element 50 comprised by the truncation unit packet indicates that the truncation unit packet relates to a splice-out access unit and the syntax element comprised by the further truncation unit packet indicates that the further truncation unit packet relates not to a splice-out access unit.

A8. Spliceable audio data stream according to aspect A6, wherein the truncation unit packet 42 and the further truncation unit packet 58 comprise a splice-out syntax element, respectively, which indicates whether the respective one of the truncation unit packet or the further truncation unit packet relates to a splice-out access unit or not, wherein the syntax element 50 comprised by the truncation unit packet indicates that the truncation unit packet relates to a splice-out access unit and the splice-out syntax element comprised by the further truncation unit packet indicates that the further truncation unit packet relates to a splice-out access unit, too, wherein the further truncation unit packet comprises a leading/trailing-end truncation syntax element 54 and a truncation length element 48, wherein the leading/trailing-end truncation syntax element is for indicating whether the end portion of the further audio frame is a trailing end portion 44 or a leading end portion 56 and the truncation length element is for indicating a length $\Delta t$ of the end portion of the further audio frame.

A9. Spliceable audio data stream according to any of aspects A1 to A8, which is rate controlled to vary around, and obey, a predetermined mean bitrate so that an integrated bitrate deviation from the predetermined mean bitrate assumes, at the predetermined access unit, a value within a predetermined interval which is less than ½ wide than a range of the integrated bitrate deviation as varying over the complete spliceable audio data stream.

A10. Spliceable audio data stream according to any of aspects A1 to A8, which is rate controlled to vary around, and obey, a predetermined mean bitrate so that an integrated bitrate deviation from the predetermined mean bitrate assumes, at the predetermined access unit, a fixed value smaller than ¾ of a maximum of the integrated bitrate deviation as varying over the complete spliceable audio data stream.

A11. Spliceable audio data stream according to any of aspects A1 to A8, which is rate controlled to vary around, and obey, a predetermined mean bitrate so that an integrated bitrate deviation from the predetermined mean bitrate assumes, at the predetermined access unit as well as other access units for which truncation unit packets are present in the spliceable audio data stream, a predetermined value.

B1. Spliced audio data stream, comprising:
a sequence of payload packets 16, each of the payload packets belonging to a respective one of a sequence of access units 18 into which the spliced audio data stream is partitioned, each access unit being associated with a respective one of audio frames 14;
a truncation unit packet 42; 58; 114 inserted into the spliced audio data stream and indicating an end portion 44; 56 of an audio frame with which a predetermined access unit is associated, as to be discarded in playout,
wherein in a first subsequence of payload packets of the sequence of payload packets, each payload packet belongs to an access unit $AU_\#$ of a first audio data stream having encoded thereinto a first audio signal in units of audio frames of the first audio signal, and the access units of the first audio data stream including the predetermined access unit, and in a second subsequence of payload packets of the sequence of payload packets, each payload packet belongs to access units $AU'_\#$ of a second audio data stream having encoded thereinto a second audio signal in units of audio frames of the second audio data stream,
wherein the first and the second subsequences of payload packets are immediately consecutive with respect to each other and abut each other at the predetermined access unit and the end portion is a trailing end portion 44 in case of the first subsequence preceding the second subsequence and a leading end portion 56 in case of the second subsequence preceding the first subsequence.

B2. Spliced audio data stream according to aspect B1, wherein the first subsequence precedes the second subsequence and the end portion as a trailing end portion 44.

B3. Spliced audio data stream according to aspect B1 or B2, wherein the spliced audio data stream further comprises a further truncation unit packet 58 inserted into the spliced audio data stream and indicating a leading end portion 58 of a further audio frame with which a further predetermined access unit $AU_j$ is associated, as to be discarded in playout, wherein in a third subsequence of payload packets of the sequence of payload packets, each payload packet belongs to access units $AU''_\#$ of a third audio data stream having encoded therein a third audio signal, or to access units $AU_\#$ of the first audio data stream, following the access units of the first audio data stream to which the payload packets of the first subsequence belong, wherein the access units of the second audio data stream include the further predetermined access unit.

B4. Spliced audio data stream according to aspect B3, wherein a majority of the access units of the spliced audio data stream including the predetermined access unit has encoded thereinto the respective associated audio frame in a manner so that a reconstruction thereof at decoding side is dependent on a respective immediately preceding access unit, wherein the access unit such as $AU_{i+1}$, immediately succeeding the predetermined access unit and forming an onset of the access units of the second audio data stream has encoded thereinto the respective associated audio frame in a manner so that the reconstruction thereof is independent from the predetermined access unit such as $AU_i$, thereby allowing immediate playout, and the further predetermined access unit $AU_j$ has encoded thereinto the further audio frame in a manner so that the reconstruction thereof is independent from the access unit immediately preceding further predetermined access unit, thereby allowing immediate playout, respectively.

B5. Spliced audio data stream according to aspect B3 or B4, wherein the spliced audio data stream further comprises an even further truncation unit packet 114 inserted into the spliced audio data stream and indicating a trailing end portion 44 of an even further audio frame with which the access unit such as $AU'_K$ immediately preceding the further predetermined access unit such as $AU_j$ is associated, as to be discarded in playout, wherein the spliced audio data stream comprises timestamp information 24 indicating for each access unit of the spliced audio data stream a respective timestamp at which the audio frame with which the respective access unit is associated, is to be played out, wherein a timestamp of the further predetermined access unit equals the timestamp of the access unit immediately preceding the further predetermined access unit plus a temporal length of the audio frame with which the access unit immediately preceding the further predetermined access unit is associated, minus the sum of a temporal length of the leading end portion of the further audio frame and the trailing end portion of the even further audio frame or equals the timestamp of the access unit immediately preceding the further predetermined access unit plus a temporal length of the audio frame with which the access unit immediately preceding the further predetermined access unit is associated, minus the temporal length of the trailing end portion of the even further audio frame.

B6. Spliced audio data stream according to aspect B2, wherein the spliced audio data stream further comprises an even further truncation unit packet 58 inserted into the spliced audio data stream and indicating a leading end portion 56 of an even further audio frame with which the access unit such as $AU_j$ immediately succeeding the predetermined access unit such as $AU'_K$ is associated, as to be discarded in playout, wherein the spliced audio data stream comprises timestamp information 24 indicating for each access unit of the spliced audio data stream a respective timestamp at which the audio frame with which the respective access unit is associated, is to be played out, wherein a timestamp of the access unit immediately succeeding the predetermined access unit equals the timestamp of the predetermined access unit plus a temporal length of the audio frame with which the predetermined access unit is associated minus the sum of a temporal length of the trailing end portion of the audio frame with which the predetermined access unit is associated and the leading end portion of the further even access unit or equals the timestamp of the predetermined access unit plus a temporal length of the audio frame with which the predetermined access unit is associated minus the temporal length of the trailing end portion of the audio frame with which the predetermined access unit is associated.

B7. Spliced audio data stream according to aspect B6, wherein a majority of the access units of the spliced audio data stream has encoded thereinto the respective associated audio frame in a manner such that a reconstruction of thereof at decoding side is dependent on a respective immediately preceding access unit, wherein the access unit immediately succeeding the predetermined access unit and forming an onset of the access units of the second audio data stream has encoded thereinto the respective associated audio frame in a manner so that the reconstruction of thereof at decoding side is independent from the predetermined access unit, thereby allowing immediate playout.

B8. Spliced audio data stream according to aspect B7, wherein the first and second audio data streams are encoded using different coding configurations, wherein the access unit immediately succeeding the predetermined access unit and forming an onset of the access units of the second audio data stream has encoded thereinto configuration data cfg for configuring a decoder anew.

B9. Spliced audio data stream according to aspect B4, wherein the spliced audio data stream further comprises an even even further truncation unit packet 112 inserted into the spliced audio data stream and indicating a leading end portion of an even even further audio frame with which the access unit immediately succeeding the predetermined access unit is associated, as to be discarded in playout, wherein the spliced audio data stream comprises timestamp information 24 indicating for each access unit a respective timestamp at which the audio frame with which the respective access unit is associated, is to be played out, wherein a timestamp of the access unit immediately succeeding the predetermined access unit is equal to the timestamp of the predetermined access unit plus a temporal length of the audio frame associated with the predetermined access unit minus the sum of a temporal length of the leading end portion of the even even further audio frame and a temporal length of the trailing end portion of the audio frame associated with the predetermined access unit or equal to the timestamp of the predetermined access unit plus a temporal length of the audio frame associated with the predetermined access unit minus the temporal length of the temporal length of the trailing end portion of the audio frame associated with the predetermined access unit.

B10. Spliced audio data stream according to aspect B4, B5 or B9, wherein a temporal timestamp of the access unit immediately succeeding the predetermined access unit is equal to the timestamp of the predetermined access unit plus a temporal length of the audio frame with which the predetermined access unit is associated, minus a temporal length of the trailing end portion of the audio frame with which the predetermined access unit is associated.

C1. Stream splicer for splicing audio data streams, comprising:
a first audio input interface 102 for receiving a first audio data stream 40 comprising a sequence of payload packets 16, each of which belongs to a respective one of a sequence of access units 18 into which the first audio data stream is partitioned, each access unit of the first audio data stream being associated with a respective one of audio frames 14 of a first audio signal 12 which is encoded into the first audio data stream in units of audio frames of the first audio signal;
a second audio input interface 104 for receiving a second audio data stream 110 comprising a sequence of payload packets, each of which belongs to a respective one of a sequence of access units into which the second audio data stream is partitioned, each access unit of the second audio data stream being associated with a respective one of audio frames of a second audio signal which is encoded into the second audio data stream in units of audio frames of the second audio signal;
a splice point setter; and
a splice multiplexer,
wherein the first audio data stream further comprises a truncation unit packet 42; 58 inserted into the first audio data stream and being settable so as to indicate for a predetermined access unit, an end portion 44; 56 of an audio frame with which a predetermined access unit is associated, as to be discarded in playout, and the splice point setter 106 is configured to set the truncation unit packet 42; 58 so that the truncation unit packet indicates an end portion 44; 56 of the audio frame with which the predetermined access unit is associated, as to be discarded in playout, or the splice point setter 106 is configured to insert a truncation unit packet 42; 58 into the first audio data stream and sets same so as to indicate for a predetermined access unit, an end portion 44; 56 of an audio frame with which a predetermined access unit is associated, as to be discarded in playout-set the truncation unit packet 42; 58 so that the truncation unit packet indicates an end portion 44; 56 of the audio frame with which the predetermined access unit is associated, as to be discarded in playout; and
wherein the splice multiplexer 108 is configured to cut the first audio data stream 40 at the predetermined access unit so as to obtain a subsequence of payload packets of the first audio data stream within which each payload packet belongs to a respective access unit of a run of access units of the first audio data stream including the predetermined access unit, and splice the subsequence of payload packets of the first audio data stream and the sequence of payload packets of the second audio data stream so that same are immediately consecutive with respect to each other and abut each other at the predetermined access unit, wherein the end portion of the audio frame with which the predetermined access unit is associated is a trailing end portion 44 in case of the subsequence of payload packets of the first audio data stream preceding the sequence of payload packets of the second audio data stream and a leading end portion 56 in case of the subsequence of payload packets of the first audio data stream succeeding the sequence of payload packets of the second audio data stream.

C2. Stream splicer according to aspect C1, wherein the subsequence of payload packets of the first audio data stream precedes the second subsequence the sequence of payload packets of the second audio data stream and the end portion of the audio frame with which the predetermined access unit is associated is a trailing end portion 44.

C3. Stream splicer according to aspect C2, wherein the stream splicer is configured to inspect a splice-out syntax element 50 comprised by the truncation unit packet and to perform the cutting and splicing on a condition whether the splice-out syntax element 50 indicates the truncation unit packet as relating to a splice-out access unit.

C4. Stream splicer according to any of aspects C1 to C3, wherein the splice point setter is configured to set a temporal length of the end portion so as to coincide with an external clock.

C5. Stream splicer according to aspect C4, wherein the external clock is a video frame clock.

C6. Spliced audio data stream according to aspect C2, wherein the second audio data stream has, or the splice point setter 106 causes by insertion, a further truncation unit packet 114 inserted into the second audio data stream 110 and settable so as to indicate an end portion of a further audio frame with which a terminating access unit such as $AU'_K$ of the second audio data stream 110 is associated, as to be discarded in playout, and the first audio data stream further comprises an even further truncation unit packet 58 inserted into the first audio data stream 40 and settable so as to indicate an end portion of an even further audio frame with which the even further predetermined access unit such as $AU_j$ is associated, as to be discarded in playout, wherein a temporal distance between the audio frame of the predetermined access unit such as $AU_i$ and the even further audio frame of the even further predetermined access unit such as $AU_j$ coincides with a temporal length of the second audio signal between a leading access unit such as $AU'_1$ thereof succeeding, after splicing, the predetermined access unit such as $AU_i$ and the trailing access unit such as $AU'_K$, wherein the splice-point setter 106 is configured to set the further truncation unit packet 114 so that same indicates a trailing end portion 44 of the further audio frame as to be discarded in playout, and the even further truncation unit packet 58 so that same indicates a leading end portion of the even further audio frame as to be discarded in playout, wherein the splice multiplexer 108 is configured to adapt timestamp information 24 comprised by the second audio data stream 110 and indicating for each access unit a respective timestamp at which the audio frame with which the respective access unit is associated, is to be played out, so that a time stamp of a leading audio frame which the leading access unit of the second audio data stream 110 is associated coincides with the timestamp of the audio frame with which the predetermined access unit is associated plus the temporal length of the audio frame with which the predetermined access unit is associated minus the temporal length of the trailing end portion of the audio frame with which the predetermined access unit is associated and the splice-point setter 106 is configured to set the further truncation unit packet 114 and the even further truncation unit packet 58 so that a timestamp of the even further audio frame equals the timestamp of the further audio frame plus a temporal length of the further audio frame minus the sum of a temporal length of the trailing end portion of the further audio frame and the leading end portion of the even further audio frame.

C7. Spliced audio data stream according to aspect C2, wherein the second audio data stream 110 has, or the splice point setter 106 causes by insertion, a further truncation unit packet 112 inserted into the second audio data stream and settable so as to indicate an end portion of a further audio frame with which a leading access unit such as $AU'_1$ of the second audio data stream is associated, as to be discarded in playout, wherein the splice-point setter 106 is configured to set the further truncation unit packet 112 so that same indicates a leading end portion of the further audio frame as to be discarded in playout, wherein timestamp information 24 comprised by the first and second audio data streams and indicating for each access unit a respective timestamp at which the audio frame with which the respective access unit of the first and second audio data streams is associated, is to be played out, are temporally aligned and the splice-point setter 106 is configured to set the further truncation unit packet 112 so that a timestamp of the further audio frame minus a temporal length of the audio frame with which the predetermined access unit such as $AU_i$ is associated plus a temporal length of the leading end portion equals the timestamp of the audio frame with which the predetermined access unit is associated plus a temporal length of the audio frame with which the predetermined access unit is associated minus the temporal length of the trailing end portion.

D1. Audio decoder comprising:
an audio decoding core 162 configured to reconstruct an audio signal 12, in units of audio frames 14 of the audio signal, from a sequence of payload packets 16 of an audio data stream 120, wherein each of the payload packets belongs to a respective one of a sequence of access units 18 into which the audio data stream is partitioned, wherein each access unit is associated with a respective one of the audio frames; and
an audio truncator 164 configured to be responsive to a truncation unit packet 42; 58; 114 inserted into the audio data stream so as to truncate an audio frame associated with a predetermined access unit so as to discard, in playing out the audio signal, an end portion thereof indicated to be discarded in playout by the truncation unit packet.

D2. Audio decoder according to aspect D1, wherein the end portion is a trailing end portion 44 or a leading end portion 56.

D3. Audio decoder according to aspect D1 or D2, wherein a majority of the access units of the audio data stream have encoded thereinto the respective associated audio frame in a manner so that the reconstruction thereof is dependent on a respective immediately preceding access unit, and the audio decoding core 162 is configured to reconstruct the audio frame with which each of the majority of access units is associated depending on the respective immediately preceding access unit.

D4. Audio decoder according to aspect D3, wherein the predetermined access unit has encoded thereinto the respective associated audio frame in a manner so that the reconstruction thereof is independent from an access unit immediately preceding the predetermined access unit, wherein the audio decoding unit 162 is configured to reconstruct the audio frame with which the predetermined access unit is associated independent from the access unit immediately preceding the predetermined access unit.

D5. Audio decoder according to aspect D3 or D4, wherein the predetermined access unit has encoded thereinto configuration data and the audio decoding unit 162 is configured to use the configuration data for configuring decoding options according to the configuration data and apply the decoding options for reconstructing the audio frames with which the predetermined access unit and a run of access units immediately succeeding the predetermined access unit is associated.

D6. Audio decoder according to any of aspects D1 to D5, wherein the audio data stream comprises timestamp information 24 indicating for each access unit of the audio data stream a respective timestamp at which the audio frame with which the respective access unit is associated, is to be played out, wherein the audio decoder is configured to playout the audio frames with temporally aligning leading ends of the audio frames according to the timestamp information and with leaving-out the end portion of the audio frame with which the predetermined access unit is associated.

D7. Audio decoder according to any of aspects D1 to D6, configured to perform a crossfade at a junction of the end portion and a remaining portion of the audio frame.

E1. Audio encoder comprising:
an audio encoding core 72 configured to encode an audio signal 12, in units of audio frames 14 of the audio signal, into payload packets 16 of an audio data stream 40 so that each payload packet belongs to a respective one of access units 18 into which the audio data stream is partitioned, each access unit being associated with a respective one of the audio frames, and a truncation packet inserter 74 configured to insert into the audio data stream a truncation unit packet 44; 58 being settable so as to indicate an end portion of an audio frame with which a predetermined access unit is associated, as being to be discarded in playout.

E2. Audio encoder according to aspect E1, wherein the audio encoder is configured to generate a spliceable audio data stream according to any of aspects A1 to A9.

E3. Audio encoder according to aspects E1 or E2, wherein the audio encoder is configured to select the predetermined access unit among the access units depending on an external clock.

E4. Audio encoder according to aspect E3, wherein the external clock is a video frame clock.

E5. Audio encoder according to any of aspects E1 to E5, configured to perform a rate control so that a bitrate of the audio data stream varies around, and obeys, a predetermined mean bitrate so that an integrated bitrate deviation from the predetermined mean bitrate assumes, at the predetermined access unit, a value within a predetermined interval which is less than ½ wide than a range of the integrated bitrate deviation as varying over the complete spliceable audio data stream.

E6. Audio encoder according to any of aspects E1 to E5, configured to perform a rate control so that a bitrate of the audio data stream varies around, and obeys, a predetermined mean bitrate so that an integrated bitrate deviation from the predetermined mean bitrate assumes, at the predetermined access unit, a fixed value smaller than ¾ of a maximum of the integrated bitrate deviation as varying over the complete spliceable audio data stream.

E7. Audio encoder according to any of aspects E1 to E5, configured to perform a rate control so that a bitrate of the audio data stream varies around, and obeys, a predetermined mean bitrate so that an integrated bitrate deviation from the predetermined mean bitrate assumes, at the predetermined access unit as well as other access units for which truncation unit packets are inserted into the audio data stream, a predetermined value.

E8. Audio encoder according to any of aspects E1 to E7, configured to perform a rate control by logging a coded audio decoder buffer fill state so that a logged fill state assumes, at the predetermined access unit, a predetermined value.

E9. Audio encoder according to aspect E8, wherein the predetermined value is common among access units for which truncation unit packets are inserted into the audio data stream.

E10. Audio encoder according to aspect E8, configured to signal the predetermined value within the audio data stream.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive spliced or splicable audio data streams can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] METHOD AND ENCODER AND DECODER FOR SAMPLE-ACCURATE REPRESENTATION OF AN AUDIO SIGNAL, IIS1b-10 F51302 WO-ID, FH110401PID
[2] ISO/IEC 23008-3, Information technology—High efficiency coding and media delivery in heterogeneous environments—Part 3: 3D audio
[3] ISO/IEC DTR 14496-24: Information technology—Coding of audio-visual objects—Part 24: Audio and systems interaction

The invention claimed is:

1. A method for audio decoding, comprising:
receiving a spliceable audio data stream, comprising:
   a sequence of payload packets, each of the payload packets belonging to a respective one of a sequence of access units into which the spliceable audio data stream is partitioned, each access unit being associated with a respective one of audio frames of an audio signal which is encoded into the spliceable audio data stream in units of the audio frames; and
   a truncation unit packet inserted into the spliceable audio data stream and being settable so as to indicate, for a predetermined access unit, an end portion of an audio frame with which the predetermined access unit is associated, as to be discarded in playout,
   a further predetermined access unit which has encoded thereinto the respective associated audio frame in a manner so that the reconstruction thereof at decoding side is independent from the access unit immediately preceding the further predetermined access unit, thereby allowing immediate playout,
decoding the audio signal from the access units with
   discarding, for the predetermined access unit, the end portion of the audio frame with which the predetermined access unit is associated, in playout, and
   reconstructing, from the further predetermined access unit, the respective associated audio frame independent from the access unit immediately preceding the further predetermined access unit.

2. The method according to claim 1, wherein the truncation unit packet and the further truncation unit packet comprise a splice-out syntax element, respectively, which indicates whether the respective one of the truncation unit packet or the further truncation unit packet relates to a splice-out access unit or not, wherein the splice-out syntax element comprised by the truncation unit packet indicates that the truncation unit packet relates to a splice-out access unit and the syntax element comprised by the further truncation unit packet indicates that the further truncation unit packet relates not to a splice-out access unit.

3. The method according to claim 1, wherein the truncation unit packet and the further truncation unit packet comprise a splice-out syntax element, respectively, which indicates whether the respective one of the truncation unit packet or the further truncation unit packet relates to a splice-out access unit or not, wherein the syntax element comprised by the truncation unit packet indicates that the truncation unit packet relates to a splice-out access unit and the splice-out syntax element comprised by the further truncation unit packet indicates that the further truncation unit packet relates to a splice-out access unit, too.

4. The method according to claim 1, wherein the further truncation unit packet comprises a leading/trailing-end truncation syntax element and a truncation length element, wherein the leading/trailing-end truncation syntax element is for indicating whether the end portion of the further audio frame is a trailing end portion or a leading end portion and the truncation length element is for indicating a length of the end portion of the further audio frame.

5. A method for audio decoding, comprising:
receiving a spliced audio data stream, comprising:
   a sequence of payload packets, each of the payload packets belonging to a respective one of a sequence of access units into which the spliced audio data stream is partitioned, each access unit being associated with a respective one of audio frames;
   a truncation unit packet inserted into the spliced audio data stream and indicating an end portion of an audio frame with which a predetermined access unit is associated, as to be discarded in playout,
   wherein in a first subsequence of payload packets of the sequence of payload packets, each payload packet belongs to an access unit of a first audio data stream having encoded thereinto a first audio signal in units of audio frames of the first audio signal, and the access units of the first audio data stream comprising the predetermined access unit, and in a second subsequence of payload packets of the sequence of payload packets, each payload packet belongs to access units of a second audio data stream having encoded thereinto a second audio signal in units of audio frames of the second audio data stream,
   wherein the first and the second subsequences of payload packets are immediately consecutive with respect to each other and abut each other at the predetermined access unit and the end portion is a trailing end portion in case of the first subsequence preceding the second subsequence and a leading end portion in case of the second subsequence preceding the first subsequence, and
   reconstructing from the access unit immediately succeeding the predetermined access unit and forming an onset of the access units of the second audio data stream, the respective associated audio frame independent from the predetermined access unit.

6. The method according to claim 5, wherein a majority of the access units of the spliced audio data stream comprising the predetermined access unit has encoded thereinto the respective associated audio frame in a manner so that a reconstruction thereof at decoding side is dependent on a respective immediately preceding access unit.

7. A method for audio decoding, comprising:
receiving a spliced audio data stream, comprising:

a sequence of payload packets, each of the payload packets belonging to a respective one of a sequence of access units into which the spliced audio data stream is partitioned, each access unit being associated with a respective one of audio frames;

a truncation unit packet inserted into the spliced audio data stream and indicating an end portion of an audio frame with which a predetermined access unit is associated, as to be discarded in playout, wherein
in a first subsequence of payload packets of the sequence of payload packets, each payload packet belongs to an access unit of a first audio data stream having encoded thereinto a first audio signal in units of audio frames of the first audio signal, and the access units of the first audio data stream comprising the predetermined access unit, and in a second subsequence of payload packets of the sequence of payload packets, each payload packet belongs to access units of a second audio data stream having encoded thereinto a second audio signal in units of audio frames of the second audio data stream, the first and the second subsequences of payload packets are immediately consecutive with respect to each other and abut each other at the predetermined access unit and the end portion is a trailing end portion in case of the first subsequence preceding the second subsequence and a leading end portion in case of the second subsequence preceding the first subsequence, a further predetermined access unit which has encoded thereinto the further audio frame in a manner so that the reconstruction thereof is independent from the access unit immediately preceding further predetermined access unit, thereby allowing immediate playout, respectively, a further truncation unit packet inserted into the spliced audio data stream and indicating a leading end portion of a further audio frame with which a further predetermined access unit is associated, as to be discarded in playout, wherein in a third subsequence of payload packets of the sequence of payload packets, each payload packet belongs to access units of a third audio data stream having encoded therein a third audio signal, or to access units of the first audio data stream, following the access units of the first audio data stream to which the payload packets of the first subsequence belong, wherein the access units of the third audio data stream comprise the further predetermined access unit, reconstructing, from the further predetermined access unit, the further audio frame independent from the access unit immediately preceding further predetermined access unit, and discarding in playout the end portion of the audio frame with which the predetermined access unit is associated.

8. A method for audio decoding, comprising:

reconstructing an audio signal, in units of audio frames of the audio signal, from a sequence of payload packets of an audio data stream, wherein each of the payload packets belongs to a respective one of a sequence of access units into which the audio data stream is partitioned, wherein each access unit is associated with a respective one of the audio frames; and an audio truncator configured to be responsive to a truncation unit packet inserted into the audio data stream so as to truncate an audio frame associated with a predetermined access unit so as to discard, in playing out the audio signal, an end portion thereof indicated to be discarded in playout by the truncation unit packet, wherein the truncation unit packet comprises a truncation length element, wherein the method comprises using the truncation length element as an indication of a length of the end portion of the audio frame, wherein the method further comprises, responding to a signaling in the predetermined access unit, switch between
decoding from the predetermined access unit the audio frame in a manner dependent on an access unit immediately preceding the predetermined access unit, in case of the signaling having a first state, or
decoding from the predetermined access unit the audio frame in a manner independent from an access unit immediately preceding the predetermined access unit, in case of the signaling having a second state.

* * * * *